US012700759B2

(12) United States Patent
     Hansen et al.

(10) Patent No.: US 12,700,759 B2
(45) Date of Patent: Aug. 4, 2026

(54) WIRELESS POWER TRANSMITTER MODULE AND CONTROLLER

(71) Applicant: Solace Power Inc., Mount Pearl (CA)

(72) Inventors: Noah Hansen, Mount Pearl (CA);
               Ahmad Almudallal, Mount Pearl (CA);
               Samer Aldhaher, Mount Pearl (CA)

(73) Assignee: SOLACE POWER INC., Mount Pearl
               (CA)

( * ) Notice: Subject to any disclaimer, the term of this
              patent is extended or adjusted under 35
              U.S.C. 154(b) by 0 days.

(21) Appl. No.: 18/638,915

(22) Filed: Apr. 18, 2024

(65) Prior Publication Data

US 2024/0356387 A1      Oct. 24, 2024

Related U.S. Application Data

(60) Provisional application No. 63/460,950, filed on Apr.
     21, 2023.

(51) Int. Cl.
     *H02J 50/90*      (2016.01)
     *H02J 50/12*      (2016.01)
     *H02J 50/40*      (2016.01)
     *H02J 50/80*      (2016.01)

(52) U.S. Cl.
     CPC .............. *H02J 50/90* (2016.02); *H02J 50/12*
     (2016.02); *H02J 50/402* (2020.01); *H02J
     50/80* (2016.02)

(58) Field of Classification Search
     CPC .......... H02J 50/90; H02J 50/12; H02J 50/402;
                   H02J 50/80; H02J 50/40
     See application file for complete search history.

(56) References Cited

U.S. PATENT DOCUMENTS

| | | | | |
|---|---|---|---|---|
| 2021/0273491 A1* | 9/2021 | Lee | ......................... | H02J 50/402 |
| 2024/0356387 A1* | 10/2024 | Hansen | .................... | H02J 50/40 |
| 2024/0372400 A1* | 11/2024 | Kim | ....................... | H02M 3/335 |

FOREIGN PATENT DOCUMENTS

| | | |
|---|---|---|
| EP | 3413436 A1 | 12/2018 |
| EP | 3550697 A1 | 10/2019 |
| WO | 2022169404 A1 | 8/2022 |

\* cited by examiner

*Primary Examiner* — Daniel Cavallari
(74) *Attorney, Agent, or Firm* — Harness, Dickey &
Pierce, P.L.C.

(57) ABSTRACT

There is provided a method of operating at least one trans-
mitter module of a wireless power transfer system. Each
transmitter module comprises a plurality of transmitter ele-
ments arranged in a plurality of offset layers with one
transmitter element per layer. The method comprises detect-
ing a receiver at at least one transmitter element of the
transmitter module. The method further comprises, in
response to the detecting, generating a power signal to
transfer power from a first transmitter element of the trans-
mitter module to the detected receiver. The method further
comprises causing a second transmitter element of the
transmitter module to remain inactive during the transfer-
ring. Controller and further methods are also provided.

12 Claims, 14 Drawing Sheets

WIRELESS POWER TRANSMITTER MODULE AND CONTROLLER

CROSS-REFERENCE TO RELATED APPLICATIONS

The subject application claims the benefit of U.S. Provisional Application No. 63/460,950 filed on Apr. 21, 2023, the entire content of which is incorporated herein by reference.

FIELD

The subject disclosure relates generally to wireless power transfer, and in particular to a transmitter module of a wireless power transfer system, a receiver of the system and method of operating the module, receiver and system.

BACKGROUND

Wireless power transfer systems such as wireless charging are becoming an increasingly important technology to enable the next generation of devices. The potential benefits and advantages offered by the technology is evident by the increasing number of manufacturers and companies investing in the technology. A variety of wireless power transfer systems are known. A typical wireless power transfer system includes a power source electrically connected to a wireless power transmitter, and a wireless power receiver electrically connected to a load.

In magnetic induction systems, the transmitter has a transmitter coil with a certain inductance that transfers electrical energy from the power source to the receiver, which has a receiver coil with a certain inductance. Power transfer occurs due to coupling of magnetic fields between the coils or inductors of the transmitter and receiver. The range of these magnetic induction systems is limited, and the coils or inductors of the transmitter and receiver must be tightly coupled to have an efficient wireless system, i.e., have a coupling factor above 0.5 and be in optimal alignment for efficient power transfer.

There also exists resonant magnetic systems in which power is transferred due to coupling of magnetic fields between the coils or inductors of the transmitter and receiver. The transmitter and receiver inductors may be loosely coupled, i.e., have a coupling factor below 0.5, but still transfer power. However, in resonant magnetic systems the inductors are resonated using at least one capacitor. Furthermore, in resonant magnetic systems, the transmitter is self-resonant and the receiver is self-resonant. The range of power transfer in resonant magnetic systems is increased over that of magnetic induction systems and alignment issues may be partially addressed. While electromagnetic energy is produced in magnetic induction and resonant magnetic systems, the majority of power transfer occurs via the magnetic field. Little, if any, power is transferred via electric field coupling or resonant electric field coupling.

In electrical capacitive systems, the transmitter and receiver have capacitive electrodes. Power transfer occurs due to coupling of electric fields between the capacitive electrodes of the transmitter and receiver. Similar, to resonant magnetic systems, there exist resonant electric systems in which the capacitive electrodes of the transmitter and receiver are made resonant using at least one inductor. The inductor may be a coil. In resonant electric systems, the transmitter is self-resonant, and the receiver is self-resonant. Resonant electric systems have an increased range of power transfer compared to that of electric field systems and alignment issues are at least partially addressed. While electromagnetic energy is produced in electric field and resonant electric systems, the majority of power transfer occurs via the electric field. Little, if any, power is transferred via magnetic induction or resonant magnetic induction.

While some wireless power transfer systems are known, improvements and/or alternatives are desired.

This background serves only to set a scene to allow a person skilled in the art to better appreciate the following description. Therefore, none of the above discussion should necessarily be taken as an acknowledgement that the discussion is part of the state of the art or is common general knowledge. One or more aspects/embodiments of the invention may or may not address one or more of the background issues.

SUMMARY

As described above, in some wireless power transfer systems a receiver element of a receiver is aligned with a corresponding transmitter element of a transmitter. Power is then extracted by the receiver from the transmitter and/or transferred from the transmitter to the receiver via magnetic and/or electric field coupling between the elements. The efficiency of this power transfer may be impacted by separation distance and misalignment between the elements. While the described resonant magnetic and electric systems may at least partially mitigate the alignment issues, efficiency may still not be maximized.

Additionally, movement of the transmitter or receiver may increase the misalignment between elements. This may be addressed by adding elements, e.g., transmitters with transmitter elements, and then transferring power between the most aligned elements. However, simply adding transmitter elements may not provide adequate spatial freedom. Additionally, selecting the appropriate transmitter element for power transfer and determining optimized operating parameters may not be straightforward.

Accordingly, in an aspect there is provided a transmitter module comprising a plurality of transmitter elements. The transmitter elements are arranged in a plurality of offset layers, e.g., laterally offset in the z-axis, with one transmitter element per layer. In other words, the transmitter module comprises a multi-layered transmitter element array comprising a plurality of stacked and staggered transmitter elements.

Each transmitter element extends in the x-y axis, i.e., length and width. The layers may be offset in the z axis. The transmitter elements of adjacent layers may be stacked. In other words, the elements of the layers are not aligned in the z axis.

Each transmitter element may take the form of an electrode and/or coil. The elements may be resonant with a corresponding inductor (inductive coil) or capacitor. The coil may comprise an inductor or inductive coil. The electrode may be a capacitive electrode. The coils may transfer power via magnetic field coupling while the electrode may transfer power via electric field coupling. The coupling may be resonant field coupling as described.

Transmitter elements of the transmitter module may be stacked. At least a portion of one transmitter element in a first layer may overlap or overlay a portion of another transmitter element in a second layer. The second layer may be laterally offset in the z axis.

The transmitter elements of the multiple layers of the transmitter module may form parallel planes. The plane formed by a transmitter element in a first layer may be parallel with the plane formed by a transmitter element in a second layer.

As a receiver moves along (parallel to the plane of) the transmitter module in the x or longitudinal direction, the receiver (i.e., a receiver element of the receiver) may be aligned with a first transmitter element in a first layer of the transmitter module, then aligned with a second transmitter element in a second layer of the transmitter module, then aligned with a third transmitter element in a third layer of the transmitter module, and so on.

While this movement is described in the x direction, movement could be in the y direction or in both the x and y direction, i.e., two dimensional.

Additionally, while a single transmitter module is described, multiple adjacent transmitter module may be present. The receiver may therefore be aligned with a first transmitter element in a first layer of a first transmitter module, then aligned with a second transmitter element in a second layer of a first transmitter module, then aligned with a third transmitter element in a first layer of a second transmitter module, and then aligned with a fourth transmitter element in a second transmitter module.

As will be described, the transmitter module may operate such that a single transmitter element transfers power to the receiver (i.e., a receiver element of the receiver) while other transmitter elements are inactive. The transmitter element transfers power by generating a field such that the receiver element is magnetically or electrically coupled and extracts power from the field. As only a single transmitter element is actively generating a field, the receiver is not subjected to multiple fields from the transmitter elements of the module. Such multiple fields would result in a combined field which may sub-optimal for the receiver thereby reducing power transfer efficiency between the transmitter element and receiver.

In order to operate only a single transmitter element, communication between the various transmitter elements of the transmitter module, and communication between the transmitter elements and the receiver may be required as will be described.

Accordingly, in an aspect there is provided a method of operating at least one transmitter module of a wireless power transfer system, each transmitter module comprising a plurality of transmitter elements arranged in a plurality of offset layers with one transmitter element per layer, the method comprising:

detecting a receiver at at least one transmitter element of the transmitter module;

in response to the detecting, generating a power signal to transfer power from a first transmitter element of the transmitter module to the detected receiver; and causing a second transmitter element of the transmitter module to remain inactive during the transferring.

As described the layers may be laterally offset in the z axis. Each transmitter element may extend in the x and y axis.

In this context, inactive may refer to the second transmitter element not generating a field to transfer power to the receiver.

Causing the second transmitter element to remain inactive may comprise controlling a switching element to supply a signal to the first transmitter element and not the second transmitter element.

Causing the second transmitter element to remain inactive may comprise communicating a signal from the first transmitter to the second transmitter element. The signal may cause the second transmitter element to be disconnected from a power source. The power source may be connected to the first transmitter element.

The receiver may comprise a receiver element. The receiver may further comprise a load electrically connected to the receiver element. The receiver element may comprise a coil and/or capacitive electrode. The receiver element may extract power from a field generated by the first transmitter element via electric and/or magnetic field coupling.

Detecting may comprise detecting the receiver based on a response signal from the receiver. The response signal may be communicated from the receiver to the transmitter module. The response module may be communicating to one, or all of the transmitter elements of the module.

The response signal may comprise a parameter of the receiver. The response signal may comprise a rectified signal at the receiver. The rectified signal may comprise the rectified power extracted from a field generated by the first transmitter element. The rectified signal may comprise the rectified voltage at the receiver.

The method may further comprise detecting a response signal at each transmitter element of the transmitter module. The receiver may communicate the response signal to each transmitter element of the transmitter module.

The method may further comprise comparing the detected response signals. The comparing may be performed by a controller of the transmitter module. The controller may identify the highest parameter, e.g., the greatest rectified voltage. The greatest rectified voltage may indicate optimised power transfer between the receiver and the first transmitter element.

The method may further comprise selecting the first transmitter element based on the comparing. The selected first transmitter element may be the element which has received the greatest rectified voltage from the receiver, or the response signal, e.g., rectified voltage, for the longest uninterrupted period of time.

The method may further comprise detecting a response signal from the receiver for a threshold period of time. For example, a transmitter element may detect the response signal for a period of 5 seconds. Based on detecting the response signal for the threshold period of time, the first transmitter may be selected. The response signal may be sent by the receiver. In particular, the response signal may be transmit or broadcast by the receiver.

The receiver may be moving and may be continuously sending the response signal during this movement. The transmitter elements of the transmitter module may each receive the response signal. However, based on their relative position with the moving receiver, each transmitter element may only receive the response signal for a period time. The period of time may be less than the threshold period of time. Once the receiver stops moving, the first transmitter element may receive the response signal for a period of time exceeding or meeting the threshold period of time. On this basis, the first transmitter element may be selected for transferring power to the receiver. The other transmitter elements of the transmitter module, e.g., the second transmitter module, may be deactivated or caused not to transfer power to the receiver. In this way, only one transmitter module may transfer power to the receiver at a time. This may eliminate the risk of combined generated fields which may result in sub-optimized power transfer, e.g., reduced power transfer efficiency between a transmitter element and receiver.

The method may further comprise communicating a control signal between transmitter elements of the transmitter module. The control signal may instructed a transmitter element, e.g., the second transmitter element to deactivate, i.e., remain inactive during the power transfer with the first transmitter element. For example, the method may comprise selecting the first transmitter element. The first transmitter element or a controller of the module, may then communicate a control signal to other elements of the module, e.g., the second transmitter element. The control signal prevents the other elements from being active while the first transmitter element is transferring power to the receiver.

The communicating may be performed by a communication module or controller of the transmitter module. The control signal may be communicated via Wi-Fi, Bluetooth or some other communication protocol or standard. The control signal may be communicated via a communicated described in Applicant's own U.S. Provisional Application No. 63/434,543, the relevant portions of which are incorporated herein by reference.

The method may further comprise communicating the response signal to a second transmitter module. The communicating may be performed by a communication module or controller of the transmitter module. The response signal may be communicated via Wi-Fi, Bluetooth or some other communication protocol or standard. The response signal may be communicated via a communicated described in Applicant's own U.S. Provisional Application No. 63/434, 543, the relevant portions of which are incorporated herein by reference.

As described, it may be undesirable to have multiple transmitter elements transferring power to a single receiver (receiver element). Communicating the response signal to the second transmitter module may cause transmitter elements of the second transmitter module to remain inactive during the power transfer, i.e., deactivate. This may ensure combined fields are not present. Only certain ones of the transmitter elements of the second transmitter module may be caused to remain inactive. For example, a transmitter element which is co-planar with the first transmitter element, i.e., in the same layer or z axis plane as the first transmitter element, may remain active. Transmitter elements which form parallel planes, i.e., in the same layer as the second transmitter element, may be caused to remain inactive. A transmitter element that is overlapping the first transmitter element (which is actively powered) will be deactivated or be caused to remain inactive. In other words, transmitter elements which are in the same lateral layers as the first transmitter element across transmitter modules transfer power, but not those which are in different lateral layers across transmitter modules.

If the receiver (receiver element) moves, an adjacent transmitter element of the first transmitter module will be powered, and the previously-powered transmitter element will be deactivated. Similarly, the transmitter element which is in the same lateral layer as the now-powered adjacent transmitter element of the second transmitter module will be activated, while the previously-powered transmitter element of the second transmitter module will be deactivated.

The method may further comprise monitoring a signal related to power transfer between the first transmitter element and the detected receiver, e.g., the receiver element. The signal may comprise the generated power signal. The signal may comprise a rectified voltage received from the receiver. The signal may comprise a signal generated by the receiver. For example, the signal generated by the receiver may comprise a heartbeat signal indicating ongoing power transfer from the first transmitter element to the receiver, e.g., the receiver element.

The method may further comprise tuning the first transmitter element. Tuning may comprise actively tuning the first transmitter element during operation. Tuning may comprise tuning the first transmitter element after detecting the receiver and before generating the power signal. Tuning may comprise modifying one or more of the operating parameters of the transmitter element to optimise or maximise power transfer efficiency between the first transmitter element and receiver.

Tuning may comprise tuning the first transmitter element based on the response signal. The response signal may comprise the rectified voltage at the receiver. Tuning may comprise tuning the first transmitter element based on the rectified voltage at the receiver.

Tuning may comprise setting an impedance of the first transmitter element. The impedance may determine the power transfer efficiency between the first transmitter element and receiver. Setting the impedance may accordingly optimise or maximise power transfer efficiency between the first transmitter element and receiver.

The impedance may comprise an average of an impedance when the receiver is aligned with the first transmitter element and an impedance when the receiver is misaligned with the first transmitter element. The receiver may be aligned when the receiver, e.g., the receiver element, is aligned with the first transmitter element in the z axis. The receiver may be aligned when the receiver element of the receiver overlaps completely with the first transmitter element in the z axis. In particular, the receiver element and the first transmitter element may each comprise a coil, e.g., inductor. The windings of both coils may completely overlap in the z axis.

Misalignment may comprise maximum misalignment with the first transmitter element. The first transmitter element may be in maximum misalignment when the receiver, e.g., the receiver element, is aligned with the second transmitter element in the z axis. The receiver may be misaligned when the receiver element of the receiver overlaps completely with the second transmitter element in the z axis. In particular, the receiver element and the second transmitter element may each comprise a coil, e.g., inductor. The windings of both coils may completely overlap in the z axis.

The method may further comprise transmitting or broadcasting a search signal from at least one transmitter element of the transmitter module. The search signal may be low power, i.e., lower power than power transfer which occurs between the first transmitter element and the receiver. The search signal may be a pulsed signal. The at least one transmitter element may transmit low power pulses.

When a receiver is in range to receive the low power pulse from the at least one the transmitter element, the receiver may transmit the response signal to the transmitter element. As such, the method may further comprise receiving a response signal from the receiver in response to a search signal transmitted by at least one transmitter element of the transmitter module. The response signal may then cause the transmitter element to initiate power transfer between the transmitter element and the receiver. In this way, the receiver may select which transmitter element to initiate power transfer with based on the received low power pulse.

Receipt of the low power pulse by the receiver may cause the receiver to transition from a low or no power mode where the receiver is not using any power, to a power transfer mode where the receiver sends the response signal to the transmitter element in response to receiving the pulse and then beings transferring power from the transmitter element. The low power pulse may power the receiver sufficiently to send the response signal to the transmitter element.

Similarly, receipt of the response signal from the receiver may transition the transmitter element from a low power or search mode where the transmitter element is transmitting the search signal and operating in a low power mode, to a power transfer mode where the transmitter element powers up to transfer power to the receiver after receiving the response signal from the receiver.

The method may further comprise sending a control signal from the first transmitter element to the second transmitter element in response to the first transmitter element receiving the response signal from the receiver. The control signal may control operation of the second transmitter element. The control signal may control operation of all other transmitter elements in the module. The control signal may cause the second transmitter element to remain inactive during power transfer between the receiver and the first transmitter element. The control signal may instruct the second transmitter element to not transmit any signal, i.e., the search signal or a power transfer signal. The control signal may control the second transmitter element to deactivate, i.e., receive no power from a power source.

Receipt of the response signal by one transmitter element, e.g., the first transmitter element, may cause the transmitter element to communicate with other transmitter elements in the transmitter module to remain inactive during the transmitting. Further, receipt of the response signal may cause the transmitter element to instruct the other transmitter elements of the module to become inactive which may include no longer transmitting the search signal.

The method may further comprise alternatingly transmitting or broadcasting the search signal from the plurality of transmitter elements of the transmitter module. A first transmitter element may transmit the search signal, then a second transmitter element, then a third transmitter element, and so on in an alternatingly manner such that only a single transmitter element is transmitting the search signal at a time.

Transmitting or broadcasting the search signal may comprise emitting the search signal in all directions proximate the transmitter element.

The method may further comprise detecting the receiver based on the transmitted search signal. The receiver may transmit the response signal based on receiving the transmitted search signal. Receipt of the response signal by one of the transmitter elements may be used to detect the receiver. In particular, to detect that the receiver is proximate the particular transmitter element which receives the response signal.

The method may further comprise receiving a completion signal from a receiver. The completion signal may indicate the receiver is sufficiently charged by the first transmitter element. The completion signal may indicate no further power is to be transferred from the first transmitter element. The completion signal may comprise a rectified voltage of the receiver. The value of the rectified voltage may indicate sufficient power has been transferred to the receiver. The completion signal may comprise a control signal to control operation of the first transmitter element.

The method may further comprise modifying the power signal based on the completion signal. The first transmitter element may enter a trickle charge mode after receiving the completion signal. In other words, the first transmitter element may maintain the power level of the receiver, but not operate at full power, i.e., transferring the full power signal.

The method may further comprise receiving a ramp up signal from a receiver. The ramp up signal may instruct or control the first transmitter element to increase the power being transmitted to the receiver. The power transferred from the first transmitter element to the receiver may thus step up over time. Initially the power signal may be low, but upon receiving the ramp up signal, the power signal may be increased such that power is transferred to the receiver at a faster or higher rate.

The method may further comprise receiving a ramp down signal from the receiver. The ramp down signal may instruct or control the first transmitter element to decrease the power being transmitted to the receiver.

The method may further comprise indicating a state of the transmitter. The method may further comprise indicating a state of the transmitter element. The state may comprise a search state when at least transmitter element is transmitting a search signal, a power transfer state when the first transmitter element is transferring power to the receiver, an inactive state when no transmitter elements are active, i.e., sending any power signal, or an error state when one or more transmitter elements are not functioning correctly.

Indicating the state may comprise providing a visual, audio or tactile cue. For example, indicating may comprise changing a colour of an indicator on a housing of the transmitter module. The indicator may comprise a light, LED, OLED, or the like.

According to another aspect, there is provided a controller adapted to perform the described method. The controller may form part of the transmitter module or may be external to the transmitter module. The controller may comprise a processor and memory comprising computer-readable code.

According to another aspect, there is provided a transmitter module of a wireless power transfer system, the transmitter module comprising a plurality of transmitter elements arranged in a plurality of offset layers with one transmitter element per layer, each transmitter element adapted to generate a field for transferring power to a receiver, the transmitter module further comprising a controller adapted to:

detect a receiver at at least one transmitter element of the transmitter module;

in response to the detecting, generate a power signal to transfer power from a first transmitter element of the transmitter module to the detected receiver; and cause a second transmitter element of the transmitter module to remain inactive during the transferring.

The controller may be adapted to perform any of the steps of the described method.

The controller may be further adapted to control at least one transmitter element of the plurality of transmitter elements to transmit a search signal.

The search signal may be low power, i.e., lower power than power transfer which occurs between the first transmitter element and the receiver. The search signal may be a pulsed signal. The controller may be adapted to control the at least one transmitter element to transmit low power pulses.

When a receiver is in range to receive the low power pulse from at least one the transmitter element, the receiver may transmit the response signal to the transmitter element. As such, the controller may be further adapted to detect a response signal from the receiver in response to the search signal. The response signal may then cause the controller to control the transmitter element to initiate power transfer between the transmitter element and the receiver. In this way, the receiver may select which transmitter element to initiate power transfer with, based on the received low power pulse.

Receipt of the response signal from the receiver may cause the controller to control the transmitter element to transition from a low power or search mode where the transmitter element is transmitting the search signal and operating in a low power mode, to a power transfer mode where the transmitter element powers up to transfer power to the receiver after receiving the response signal from the receiver.

The controller may be further adapted to send, e.g., via a communication module of the transmitter module, a control signal from the first transmitter element to the second transmitter element in response to the first transmitter element receiving the response signal from the receiver. The control signal may control operation of the second transmitter element. The control signal may control operation of all other transmitter elements in the module. The control signal may cause the second transmitter element to remain inactive during power transfer between the receiver and the first transmitter element. The control signal may instruct the second transmitter element to not transmit any signal, i.e., the search signal or a power transfer signal. The control signal may control the second transmitter element to deactivate, i.e., receive no power from a power source.

Receipt of the response signal by one transmitter element, e.g., the first transmitter element, may cause the controller to communicate, e.g., via a communication module, with other transmitter elements in the transmitter module to remain inactive during the transmitting. Further, receipt of the response signal may cause the transmitter element to instruct the other transmitter elements of the module to become inactive which may include no longer transmitting the search signal.

The controller may be further adapted to alternatingly control the plurality of transmitter elements to transmit the search signal. The transmitter elements may alternatingly transmit the search signal. The controller may cause a first transmitter element of the module to transmit the search signal, then a second transmitter element of the module, and so on in an alternatingly manner such that only a single transmitter element is transmitting the search signal at a time.

The controller may detect the receiver based on receiving a response signal from the receiver.

The controller may be further adapted to receive a response signal from the receiver at each of at least one of the plurality of transmitter elements of the transmitter module. The controller may be further adapted to detect a response signal transmitted by the receiver.

The controller may be further adapted to compare the detected response signals. Comparing the detected response signal may comprise determining a highest one of the response signals. The response signals may comprise a rectified voltage of the receiver. The rectified voltages may correspond to the power extracted from the search signals transmitted by each of the transmitter elements. As such, one rectified voltage may be less than another if the receiver was farther from the respective transmitter element when the search signal was received. The rectified voltage which corresponds to the search signal from the transmitter element closest or best aligned with the receiver may be the highest rectified voltage.

The controller may be further adapted to select the first transmitter element based on the comparing. The first transmitter element may be selected based on receiving the highest search signal, e.g., the highest rectified voltage. The first transmitter element may be selected based on received the response signal for the longest period of time. The first transmitter element may be selected based on received the response signal for a threshold period of time. Receiving the response signal for the longest or a threshold period of time may indicate that the receiver is best aligned with the first transmitter element. This may result in maximising the power transfer or power transfer efficiency between the first transmitter element and the receiver.

The controller may be further adapted to set an impedance of the first transmitter element. Setting the impedance may comprise setting a value of the impedance. The impedance may comprise the coupling impedance between the first transmitter element and the receiver. The set coupling impedance may optimise power transferred or power transfer efficiency between the first transmitter element and the receiver.

The impedance may be an average of an impedance when the receiver is aligned with the first transmitter element and an impedance when the receiver is misaligned with the first transmitter element. The receiver may be aligned when the receiver, e.g., the receiver element, is aligned with the first transmitter element in the z axis. The receiver may be aligned when the receiver element of the receiver overlaps completely with the first transmitter element in the z axis. In particular, the receiver element and the first transmitter element may each comprise a coil, e.g., inductor. The windings of both coils may completely overlap in the z axis.

Misalignment may comprise maximum misalignment with the first transmitter element. The first transmitter element may be in maximum misalignment when the receiver, e.g., the receiver element, is aligned with the second transmitter element in the z axis. The receiver may be misaligned when the receiver element of the receiver overlaps completely with the second transmitter element in the z axis. In particular, the receiver element and the second transmitter element may each comprise a coil, e.g., inductor. The windings of both coils may completely overlap in the z axis.

The controller may be further adapted to detect a completion signal from a receiver. The controller may be further adapted to modify the power signal based on a completion signal from a receiver. The completion signal may indicate the receiver is sufficiently charged by the first transmitter element. The completion signal may indicate no further power is to be transferred from the first transmitter element. The completion signal may comprise a rectified voltage of the receiver. The value of the rectified voltage may indicate sufficient power has been transferred to the receiver. The completion signal may comprise a control signal to control operation of the first transmitter element.

The controller may be further adapted to modify the power signal based on the completion signal. The controller may control the first transmitter element to enter a trickle charge mode after receiving the completion signal. In other words, the first transmitter element may maintain the power level of the receiver, but not operate at full power, i.e., transferring the full power signal.

The controller may be further adapted to detect a ramp up signal from a receiver. The ramp up signal may cause the controller to control the first transmitter element to increase the power being transmitted to the receiver. The power transferred from the first transmitter element to the receiver may thus step up over time. Initially the power signal may be low, but upon receiving the ramp up signal, the power signal may be increased such that power is transferred to the receiver at a faster or higher rate.

The controller may be further adapted to detect a ramp down signal from the receiver. The ramp down signal may cause the controller to control the first transmitter element to decrease the power being transmitted to the receiver.

The transmitter module may be electrically connected to a DC/DC converter. The DC/DC converter may receive an input power signal and alter the power signal to a level suitable for the transmitter module, e.g., reduce the voltage level of the power signal. The transmitter module may comprise a DC/DC converter.

The transmitter module may be electrically connected to a power source. The transmitter module may comprise a power source. The power source may be electrically connected to the DC/DC converter.

Each transmitter element in the module may be connected to the power source, DC/DC converter or other electrical component of the module.

The transmitter elements of the module may be daisy chained, i.e., electrically connected, to other transmitter elements in other transmitter modules. The daisy chain of transmitter elements may be electrically connected to a single power source, or DC/DC converter.

The transmitter elements of the module may be daisy chained between modules. A transmitter element in a first layer of one module may be electrically connected to a transmitter element in a first layer of a second module and so on. The layers of the two modules may be in the lateral (z axis) plane.

The controller may be further adapted to indicate a state of the transmitter. The controller may be further adapted to indicate a state of the transmitter element. The state may comprise a search state when at least transmitter element is transmitting a search signal, a power transfer state when the first transmitter element is transferring power to the receiver, an inactive state when no transmitter elements are active, i.e., sending any power signal, or an error state when one or more transmitter elements are not functioning correctly.

The controller may be further adapted to provide a visual, audio or tactile cue. For example, indicating may comprise changing a colour of an indicator on a housing of the transmitter module. The indicator may comprise a light, LED, OLED, or the like.

According to another aspect, there is provided a method of tuning or operating a transmitter element of a plurality of transmitter elements of a transmitter module of a wireless power transfer system, the plurality of transmitter elements arranged in a plurality of offset layers with one transmitter element per layer, the method comprising:

detecting or determining a parameter of a transmitter element of the transmitter module when a receiver is in an aligned position with the transmitter element;

detecting or determining a parameter of the transmitter element when the receiver is in a misaligned position with the transmitter element; and tuning the transmitter element based on the determined parameters.

The receiver may comprise a receiver element. The receiver may be in an aligned or misaligned position when the receiver element is in an aligned or misaligned position with the transmitter element.

The receiver may be in an aligned position when the receiver, e.g., the receiver element, is aligned with the transmitter element in the z axis. The receiver may be aligned when the receiver element of the receiver overlaps completely with the transmitter element in the z axis. In particular, the receiver element and the transmitter element may each comprise a coil, e.g., inductor. The windings of both coils may completely overlap in the z axis.

The receiver may be in a misaligned position when the receiver is a maximum misaligned position. The receiver may be in maximum misalignment when the receiver, e.g., the receiver element, is aligned with the second transmitter element of the transmitter element in the z axis, e.g., a transmitter element in another layer than the transmitter element. The receiver may be misaligned when the receiver element of the receiver overlaps completely with the second transmitter element in the z axis. In particular, the receiver element and the second transmitter element may each comprise a coil, e.g., inductor. The windings of both coils may completely overlap in the z axis.

The receiver may transfer power to the transmitter element when in the aligned and misaligned positions.

Tuning the transmitter element may comprise setting an impedance of the transmitter element. The impedance may comprise an operational impedance of the transmitter element. The operational impedance may be the impedance at which the transmitter element operates to transfer power to the receiver. The operational impedance may be set based on a particular alignment and/or separation distance between the transmitter element and the receiver.

The operational impedance may comprise an average of the determined parameters, i.e., the parameter when the receiver is in the aligned position and the parameter when the receiver is in the misaligned position.

The parameter may comprise an impedance of the transmitter element. The impedance may comprise a coupling impedance between the transmitter element and the receiver.

The operational impedance may comprise an average of the determined coupling impedance between the transmitter element and the receiver in the aligned and misaligned positions. As such, the coupling impedance may comprise an average coupling impedance. Setting the operational impedance to the average coupling impedance may improve power transfer efficiency over a greater range of positions of the receiver relative to the transmitter element. In other words, the power transfer may be less efficient when the receiver is precisely aligned with the transmitter element, but more efficient, on average, over a range of lateral positions relative to the transmitter element.

According to another aspect, there is provided a method of operating a receiver of a wireless power transfer system, the receiver configured to receive power from a transmitter element of a transmitter module of a wireless power transfer system, the transmitter module comprising a plurality of transmitter elements arranged in a plurality of offset layers with one transmitter element per layer, the method comprising:

sending a signal to at least one transmitter element of a plurality of transmitter elements of a transmitter module; and extracting power from a field generated by a transmitter element of the plurality of transmitter elements, the transmitter element selected based on the signal.

The receiver may extract power only from the field generated by the transmitter element, and not from any other transmitter elements of the transmitter modules. The other transmitter elements may be inactive during power transfer from the transmitter element to the receiver.

The receiver may extract power from other transmitter elements in other transmitter modules. For example, the receiver may extract power from a first transmitter in a first layer in a first transmitter module and from a second transmitter in a second layer in a second transmitter module. The first and second layers may be in the same lateral plane, i.e., the same z plane.

Each transmitter, i.e., transmitter element, may extend in the x and y axis. In other words, each transmitter element may have major dimensions (length and width) which extend in the x and y axis. The first transmitter element of the first transmitter module and the second transmitter element of the second transmitter module may be in the same lateral plane, i.e., the same z plane.

The method may further comprise transmitting the signal to the plurality of transmitter elements. Only some of the transmitter elements may receive the signal. The signal may comprise a response signal. The response signal may be sent in response to receiving a search signal from one or more of the transmitter elements. The signal may comprise a rectified voltage of the receiver.

The method may further comprise transmitting the signal in response to receiving a search signal from at least one of the transmitter elements. The method may further comprise powering the receiver using the received search signal to transmit the response signal.

The rectified signal may indicate a proximity of the receiver to a transmitter element of the plurality of transmitter elements.

The method may further comprise transmitting the signal to a second plurality of transmitter elements of a second transmitter module.

The method may further comprise comparing power extracted from a first field generated by a first transmitter element of the plurality of transmitter elements with power extracted from a second field generated by a second transmitter element of the plurality of transmitter elements. Comparing may comprise determining a greater or higher power. Power may comprise a power level, voltage level or rectified voltage level at the receiver. Comparing may comprise determining a power which exceeds a threshold level.

The method may further comprise extracting power from the first field generated by the first transmitter element based on the comparing. The method may further comprise extracting power from only the first field generated by the first transmitter element. While other transmitter elements may generate fields, little if any, power may be extracted from these fields. The method may further comprise extracting power from only the field generated by the first transmitter element based on the power exceeding a threshold level or having the highest value.

The method may further comprise sending a signal, from the receiver, to a second transmitter element of the transmitter module to deactivate or remain inactive during power transfer from a field generated by the first transmitter element.

The method may further comprise rectifying a receiving power signal from a transmitter element. The method may further comprise powering a load using power extracted from a field generated by a transmitter element.

According to another aspect, there is provided a receiver of a wireless power transfer system, the receiver configured to receive power from a transmitter element of a transmitter module of a wireless power transfer system, the transmitter module comprising a plurality of transmitter elements arranged in a plurality of offset layers with one transmitter element per layer, the receiver comprising a receiver element for extracting power from a field generated by a transmitter element, the receiver further comprising a controller adapted to:

send a signal to at least one transmitter element of a plurality of transmitter elements of a transmitter module; and control the receiver element to extract power from a field generated by a transmitter element of the plurality of transmitter elements, the transmitter element selected based on the signal.

The receiver may extract power only from the field generated by the transmitter element, and not from any other transmitter elements of the transmitter modules. The other transmitter elements may be inactive during power transfer from the transmitter element to the receiver.

The receiver may extract power from other transmitter elements in other transmitter module. For example, the receiver may extract power from a first transmitter in a first layer in a first transmitter module and from a second transmitter in a second layer in a second transmitter module. The first and second layers may be in the same lateral plane, i.e., the same z plane. The receiver may extract power simultaneously from the first and second transmitters.

The controller may be further configured to transmit the signal to the plurality of transmitter elements. Only some of the transmitter elements may receive the signal. The signal may comprise a response signal. The response signal may be sent in response to receiving a search signal from one or more of the transmitter elements. The signal may be a response signal. The signal may comprise a rectified voltage of the receiver.

The controller may be further configured to transmit the signal in response to receiving a search signal from at least one of the transmitter elements. The controller may be further configured to power the receiver using the received search signal to transmit the response signal.

The controller may be further adapted to transmit the signal to a second plurality of transmitter elements of a second transmitter module.

The controller may be further configured to compare power extracted from a first field generated by a first transmitter element of the plurality of transmitter elements with power extracted from a second field generated by a second transmitter element of the plurality of transmitter elements. The controller may be further configured to determine a greater or higher power. Power may comprise a power level, voltage level or rectified voltage level at the receiver. The controller may be further configured to determine a power which exceeds a threshold level.

The controller may be further configured to extract power from the first field generated by the first transmitter element based on the comparing. The controller may be further configured to extract power from only the first field generated by the first transmitter element. While other transmitter elements may generate fields, little if any, power may be extracted from these fields. The controller may be further configured to extract power from only the field generated by the first transmitter element based on the power exceeding a threshold level or having the highest value.

The controller may be further configured to send, via a communication module of the receiver, for example a signal, from the receiver. The signal may be sent to a second transmitter element of the transmitter module to deactivate or remain inactive during power transfer from a field generated by the first transmitter element.

The controller may be further configured to control a rectifier of the receiver to rectify a receiving power signal from a transmitter element. The controller may be further configured to power a load of the receiver using power extracted from a field generated by a transmitter element. The load may be connected to a receiver element of the receiver.

The receiver may further comprise a rectifier for rectifying extracted power. The receiver may further comprise a load electrically connected to the receiver element. The rectifier may be electrically connected between the load and receiver element.

According to another aspect, there is provided a wireless power transfer system comprising:

a transmitter module comprising a plurality of transmitter elements arranged in a plurality of offset layers with one transmitter element per layer, each transmitter element adapted to generate a field for transferring power to a receiver, the transmitter module further comprising a transmitter controller.

The system may further comprise:

a receiver configured to receive power from a transmitter element of the transmitter module, the receiver comprising a receiver element for extracting power from a field generated by a transmitter element and a transmitter controller.

The transmitter controller may be adapted to:

detect the receiver at at least one transmitter element of the transmitter module;

in response to the detecting, generate a power signal to transfer power from a first transmitter element of the transmitter module to the detected receiver; and cause a second transmitter element of the transmitter module to remain inactive during the transferring.

The transmitter controller may be further adapted as described.

The receiver controller may be adapted to:

send a signal to at least one transmitter element of the plurality of transmitter elements of the transmitter module; and control the receiver element to extract power from a field generated by a transmitter element of the plurality of transmitter elements, the transmitter element selected based on the signal.

The receiver controller may be further adapted as described.

According to another aspect, there is provided a non-transitory computer-readable medium having computer program code stored thereon, the computer program code, when executed by a processor, configured to perform any of the described methods.

The described controller may take the form of one or more microcontrollers (MCUs).

It should be understood that any features described in relation to one aspect, example or embodiment may also be used in relation to any other aspect, example or embodiment of the present disclosure. Other advantages of the present disclosure may become apparent to a person skilled in the art from the detailed description in association with the following drawings.

BRIEF DESCRIPTION OF THE DRAWINGS

Embodiments will now be described more fully with reference to the accompanying drawings in which.

DETAILED DESCRIPTION

Figure 1:
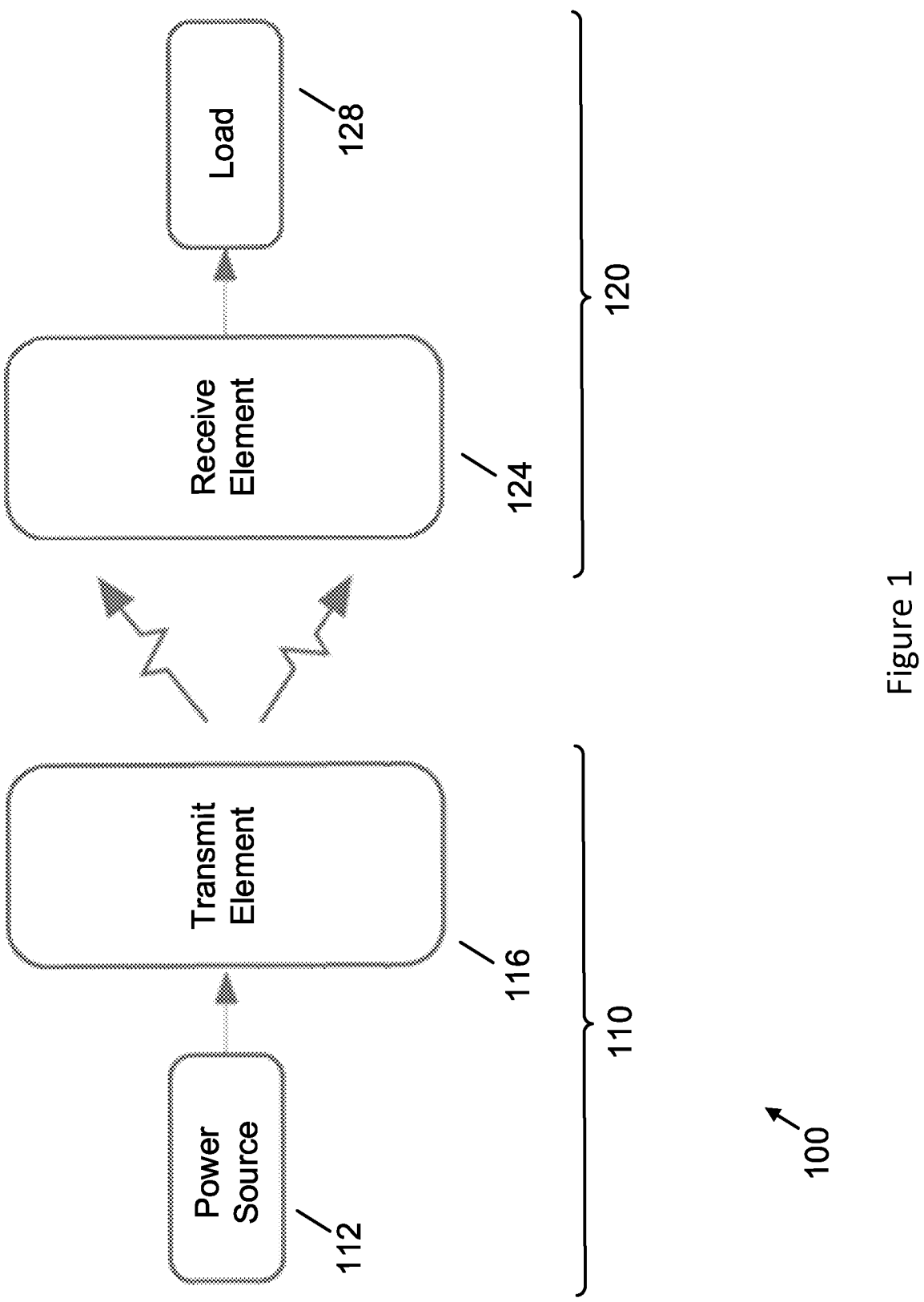
FIG. 1 is a block diagram of a wireless power transfer system.

The foregoing summary, as well as the following detailed description of certain examples will be better understood when read in conjunction with the appended drawings. As used herein, an element or feature introduced in the singular and preceded by the word "a" or "an" should be understood as not necessarily excluding the plural of the elements or features. Further, references to "one example" or "one embodiment" are not intended to be interpreted as excluding the existence of additional examples or embodiments that also incorporate the described elements or features. Moreover, unless explicitly stated to the contrary, examples or embodiments "comprising" or "having" or "including" an element or feature or a plurality of elements or features having a particular property may include additional elements or features not having that property. Also, it will be appreciated that the terms "comprises", "has", "includes" means "including but not limited to" and the terms "comprising", "having" and "including" have equivalent meanings. It will also be appreciated that like reference characters will be used to refer to like elements throughout the description and drawings.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, and/or designed for the purpose of performing the function. It is also within the scope of the subject application that elements, components, and/or other subject matter that is described as being adapted to perform a particular function may additionally or alternatively be described as being configured to perform that function, and vice versa. Similarly, subject matter that is described as being configured to perform a particular function may additionally or alternatively be described as being operative to perform that function.

It will be understood that when an element is referred to as being "on," "attached" to, "connected" to, "coupled" with, "contacting," etc., another element, it can be directly on, attached to, connected to, coupled with or contacting the other element or intervening elements may also be present.

It should be understood that use of the word "exemplary", unless otherwise stated, means 'by way of example' or 'one example', rather than meaning a preferred or optimal design or implementation.

Turning now to FIG. 1, a wireless power transfer system generally identified by reference numeral 100 is shown. The wireless power transfer system 100 comprises a transmitter 110 comprising a power source 112 electrically connected to a transmit element 116, and a receiver 120 comprising a receive element 124 electrically connected to a load 128. Power is transferred from the power source 112 to the transmit element 116. The power is then transferred from the transmit element 116 to the receive element 124 via resonant or non-resonant electric or magnetic field coupling. The power is then transferred from the receive element 124 to the load 128. Exemplary wireless power transfer systems 100 include a high frequency inductive wireless power transfer system as described in applicant's U.S. Provisional Application No. 62/899,165, or a resonant capacitively coupled wireless power transfer system as described in applicant's U.S. Pat. No. 9,653,948B2, the relevant portions of which are incorporated herein.

In the wireless power transfer system 100, power is transferred from the transmit element 116 to the receive element 124.

Figure 2:
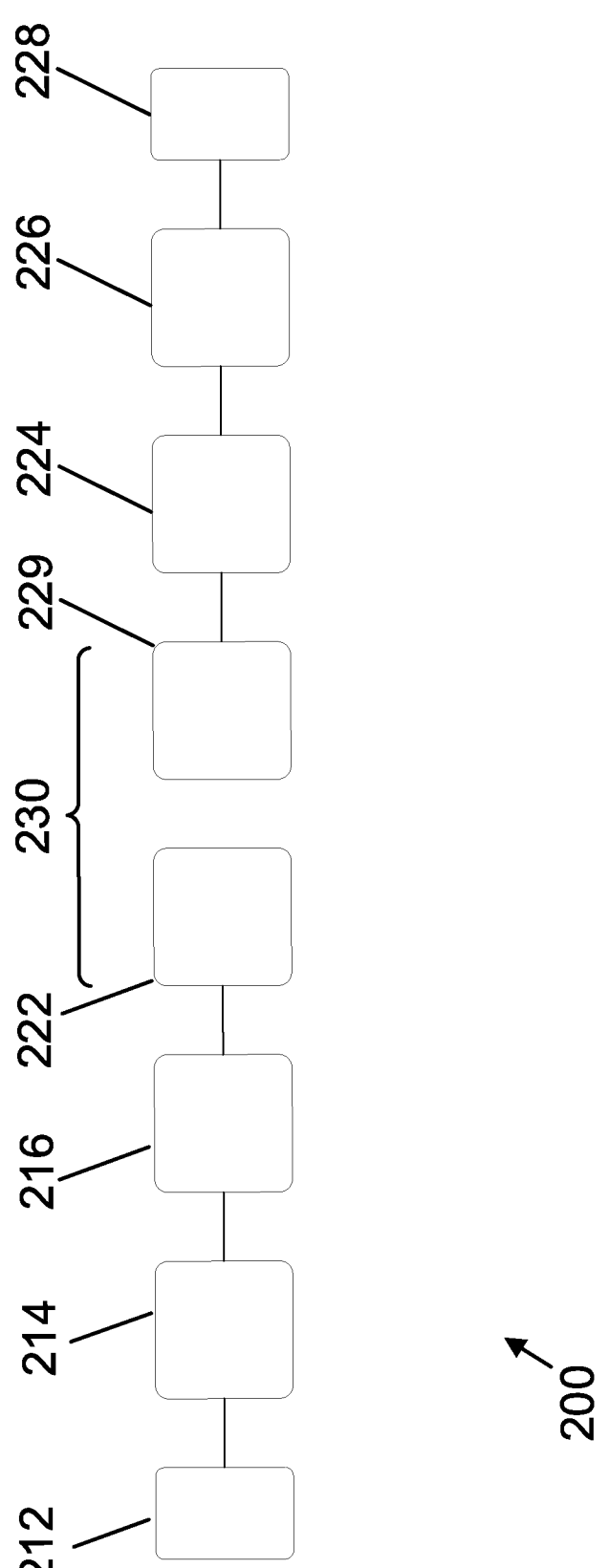
FIG. 2 is another block diagram of a wireless power transfer system.

Turning now to FIG. 2, another embodiment of a wireless power transfer system is shown generally identified as reference numeral 200. The wireless power transfer system 200 comprises a power supply 212, DC/DC converter 214, circuitry 216, and transmit element 222. The power supply 212 is electrically connected to the DC/DC converter 214. The DC/DC converter 214 is electrically connected to circuitry 216. The circuitry 216 is electrically connected to the transmit element 222.

The power supply 212 is for generating an input power signal for transmission of power. In this embodiment, the input power signal is a direct current (DC) power signal.

The DC/DC converter 214 is for converting a received DC voltage signal to a desired voltage level. The received DC voltage may be from the power supply 212. The system 200 is illustrated as comprising the DC/DC converter 214, one of skill in the art will appreciate other configurations are possible. In another embodiment, no DC/DC converter is present.

In the illustrated arrangement, the circuitry 216 comprises an inverter and an output stage. The output stage matches the output impedance of the circuitry 216 to the optimum impedance of a wireless link 230 between the transmitter and receiver. The output stage may also set the desired impedance presented to the inverter. The output stage also filters high frequency harmonic components of the inverter. The circuitry 216 further comprises a transmitter control circuit or circuitry as will be described. One of skill in the art will appreciate only the inverter and the transmitter control circuit or circuitry may be present.

The transmit element 222 comprises one or more capacitive electrodes and inductive elements, i.e., inductors. The capacitive electrodes may be laterally spaced, elongated electrodes; however, one of skill in the art will appreciate that other configurations are possible including, but not limited to, concentric, coplanar, circular, elliptical, disc, etc., electrodes. Other suitable electrode configurations are described in applicant's U.S. Pat. No. 9,979,206B2, the relevant portions of which are incorporated herein by reference. The inductive elements may comprise one or more coils. The coils may include booster or shield coils such as described in applicant's U.S. patent application Ser. No. 17/193,539, the relevant portions of which are incorporated herein by reference. The transmit element 222 may further include resonator elements for resonating the capacitive electrodes and inductive elements, i.e., capacitors and inductors.

The power source 212 supplies a DC input power signal to the DC/DC converter 214 which converts the signal to a desired voltage level. The inverter of the circuitry 216 receives the converted DC power signal and converts the DC power signal to AC to allow the ability to generate a magnetic and/or electric field at the transceiver element 222 to transfer power via electric or magnetic field coupling. Specifically, the transmit element 222 generates a magnetic/electric field to transfer power to the receiver via magnetic/electric field coupling. The power source 212, DC/DC converter 214, circuitry 216 and transmit element 222 may collectively form a transmitter 210. As previously stated, the DC/DC converter 214 may not be present in the transmitter 210.

The wireless power transfer system 200 further comprises load 228, DC/DC converter 226, circuitry 224, and receive element 229. The load 228 is electrically connected to the DC/DC converter 226. The DC/DC converter 226 is electrically connected to circuitry 224. The circuitry 224 is electrically connected to the receive element 229.

In the illustrated arrangement, the load 228 is a DC load. The load 228 may be static or variable.

The DC/DC converter 226 is for converting a received DC voltage signal to a desired voltage level. The received DC voltage may be from the circuitry 224. While the system 200 comprises the DC/DC converter 226, one of skill in the art will appreciate other configurations are possible. In another embodiment, no DC/DC converter 226 is present.

The circuitry 224 comprises an input stage and a rectifier. The input stage is configured to ensure optimum impedance presented to the receive element 229 at the full power state of the wireless power transfer system 200. The input stage may also preserve the quasi-voltage source behaviour of the receive element 229 so the output of the rectifier exhibits a stable DC voltage from no load to full load conditions. The circuitry 224 further comprises a receiver control circuit or circuitry as will be described. One of skill in the art will appreciate only the rectifier and the receiver control circuit or circuitry may be present.

The receive element 229 comprises one or more capacitive electrodes and inductive elements, i.e., inductors. The capacitive electrodes may be laterally spaced, elongate electrodes; however, one of skill in the art will appreciate that other configurations are possible including, but not limited to, concentric, coplanar, circular, elliptical, disc, etc., electrodes. Other suitable electrode configurations are described in applicant's U.S. Pat. No. 9,979,206B2, the relevant portions of which are incorporated herein by reference. The inductive elements may comprise one or more coils. The coils may include booster or shield coils such as described in applicant's U.S. patent application Ser. No. 17/193,539, the relevant portions of which are incorporated herein by reference.

The transmit and receive elements 222, 229 of the system 200 form the wireless link 230. The elements 222, 229 are separated by a wireless gap. The wireless gap may be formed by atmosphere, i.e., air, or by a physical medium, e.g., walls, glass, liquids, wood, insulations, etc. Power is transferred from one element to the other across the wireless link 230 via resonant or non-resonant magnetic and/or electric field coupling, i.e., electric or magnetic induction.

During operation, the receive element 229 extracts power from a magnetic and/or electric field generated by the transmit element 222. The circuitry 224 rectifies the received power signal. The DC/DC converter 226 converts the rectified power signal to the desired power level which is received by the load 228. In this way, the receive element 229 extracts power transmitted by the transmit element 222 (transmitter 210) such that electrical power is transferred to the load 228 via magnetic/electric field coupling. The load 228, DC/DC converter 226, circuitry 224 and receive element 229 may collectively form a receiver 220. As previously stated, the DC/DC converter 226 may not be present in the receiver 220.

Figure 3:
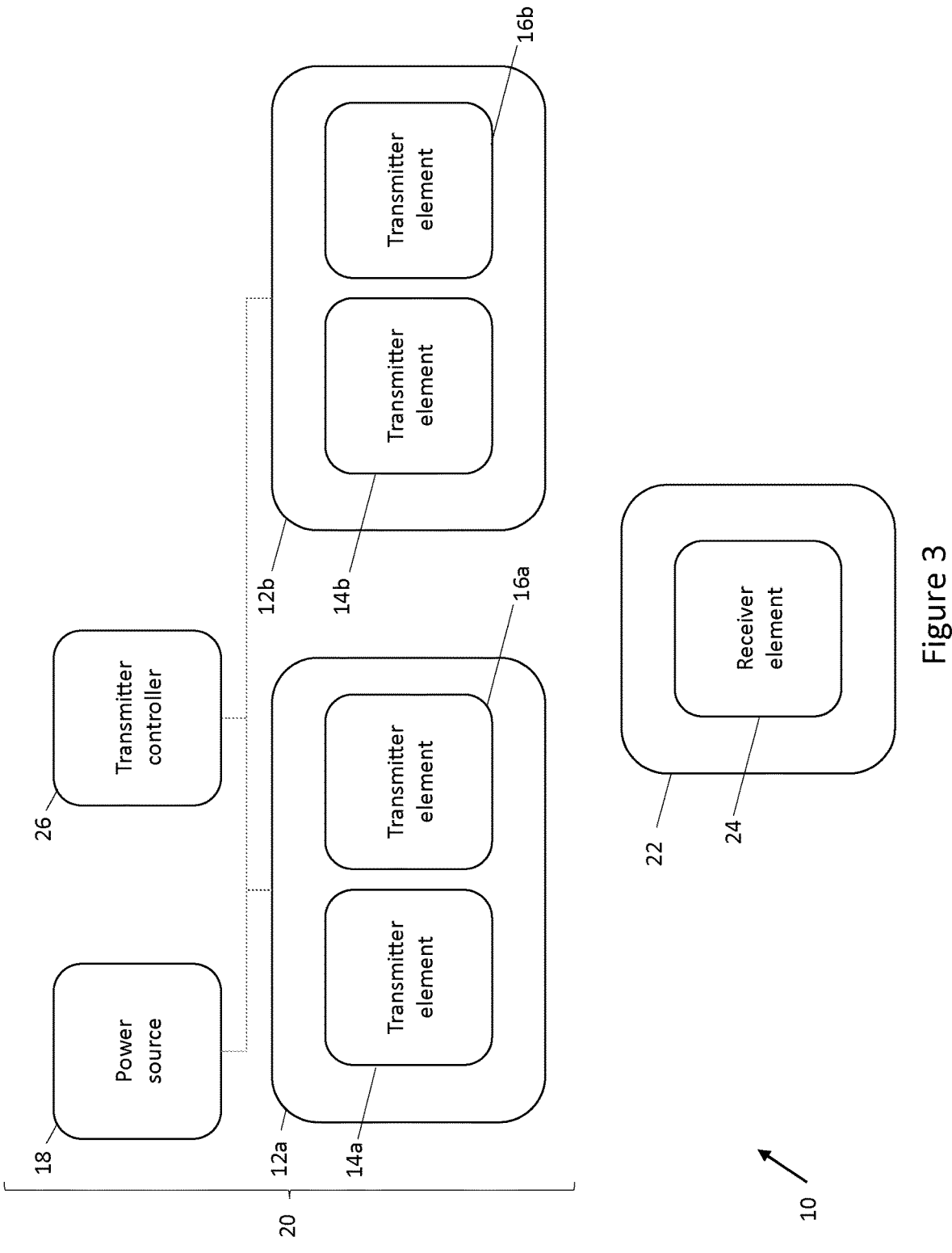
FIG. 3 is a block diagram of a wireless power transfer system according to an aspect of the disclosure.

Turning now to FIG. 3, a block diagram of a wireless power transfer system 10 in accordance with an aspect of the disclosure is illustrated.

The system 10 comprises transmitter modules 12, e.g., 12a, 12b. Each transmitter module comprises transmitter elements 14, 16, e.g., 14a, 16a and 14b, 16b. The transmitter elements are stacked and staggered. One transmitter element 14a, 14b of each module 12a, 12b is in one lateral plane (z plane) while another transmitter element 16a, 16b of each module 12a, 12b is present in another lateral plane (z plane). Thus, the transmitter elements are in a single layer which is coplanar across modules. The modules 12a, 12b are each connected in a daisy chain manner to a power source 18. While not illustrated, a DC/DC converter and circuitry as described may be connected between the modules and the power source 18. The power source 18 provides a power signal to transfer power from the transmitter elements 14, 16 to a receiver. The power source 18 may further provide a low power pulse for detecting a receiver as will be described.

The system 10 further comprises a transmitter controller 26. The transmitter controller 26 is electrically connected to the transmitter modules 12. The transmitter controller 26 controls operation of the elements. This includes controlling transmitter elements to transmit a low power pulse to detect a receiver, controlling one or more transmitter elements to ramp up power being transferred once a receiver is detected, controlling one or more elements to ramp down power being transferred once a receiver has extracted sufficient power, controlling one or more transmitter elements to deactivate or cease transferring/transmitting, and setting the operating parameters of one or more elements during power transfer. The controller 26 may comprise a microcontroller (MCU).

The transmitter modules 12, power source 18 and transmitter controller 26 may form a transmitter 20 for transferring power wirelessly to the receiver 22. Alternatively, the power source 18 may be external to the transmitter 20.

The system 10 further comprises a receiver 22 comprises a receiver element 24. The receiver 22 may comprise a load, DC/DC converter and/or circuitry as described. The receiver 22 extracts power from a field generated by one of more transmitter elements of the modules.

Efficiency of power transfer between one transmitter element and the receiver element 24 is impacted by separation distance and misalignment between the elements. Movement of the receiver 22 may increase the misalignment between elements. The described transmitter controller 30 selects the appropriate transmitter element for power transfer and determining optimized operating parameters of the power transfer as will be described.

Figure 4:
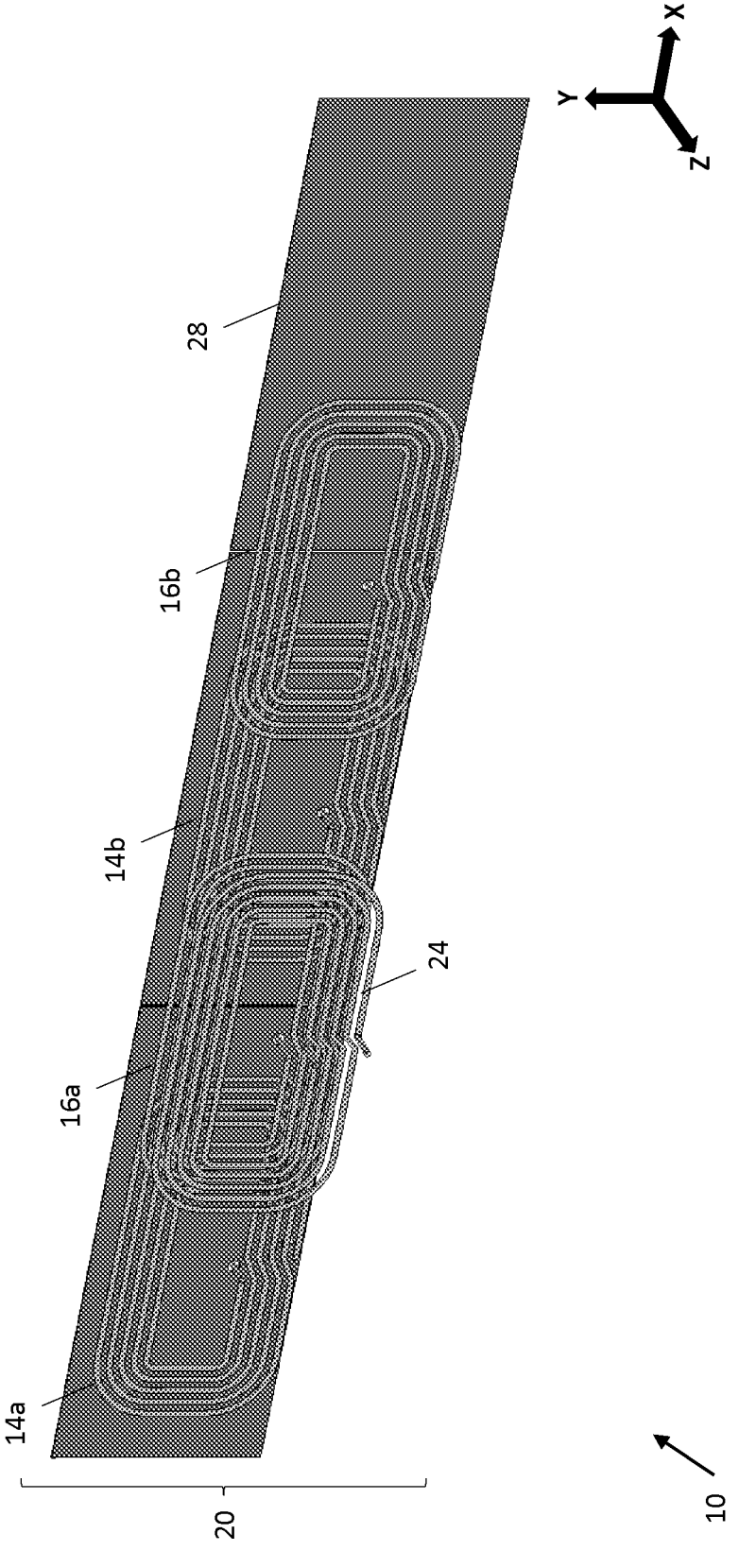
FIG. 4 is a perspective view of a portion of a wireless power transfer system according to an aspect of the disclosure.

Turning now to FIG. 4 an example of a portion of the system 10 is illustrated. In this example, the elements (transmitter and receiver element) take the form of coils, each coil comprising a single generally rectangular winding extending in the x-y plane. That is to say, each element comprise a single coil extending in a two-dimensional plane. As shown in FIG. 4, 2 transmitter modules 12 are shown each having two transmitter elements 14, 16. The elements are stacked and staggered such that one transmitter element partially overlaps another element in the z axis. Further, one transmitter element of a first module overlaps another element of a second module, e.g., element 16a overlaps element 14b.

Similarly, the receiver comprises receiver element 24 takes the form of a coil having a generally rectangular winding. The receiver element 24 may move laterally along the transmitter elements such that the receiver element 24 is in alignment with various ones of the transmitter elements. The receiver element 24 may move in a x-y plane maintaining the separation distance between the transmitter 20, i.e., the z-axis position. For example, the receiver element 24 is illustrated as being in alignment with transmitter element 16a in the x-y axis, but the receiver element 24 may initially be in alignment with element 16b, then element 14b due to movement of the receiver 22. The receiver 22 may stop moving when the element 24 is in alignment with transmitter element 16a.

The transmitter 20 further comprises shield 28. The shield 28 may comprise a series of plates which restrict fields generated by the elements to one direction. The shield 28 may comprise the passive electrode described in applicant's U.S. patent Ser. No. 11/139,690B2, the relevant portions of which are incorporated herein by reference.

While certain shapes and sizes of elements have been illustrated, one of skill in the art will appreciate these are purely for illustration and may be varied within the scope of the disclosure. Further, while coils have been illustrated the elements may instead take the form of electrodes, e.g., capacitive electrodes plates or rails.

It is inefficient to simply have all transmitter elements transferring power to the receiver 22 at all times as only one transmitter element is best aligned with the receiver element 24. Further, for safety reasons, the transmitter element should not operate at full power when a receiver 22 is not present.

The transmitter module 12 operates such that a single transmitter element transfers power to the receiver 22 (i.e., the receiver element 24) while other transmitter elements are inactive. The transmitter element transfers power by generating a field such that the receiver element 24 is magnetically coupled and extracts power from the field. As only a single transmitter element is actively generating a field, the receiver is not subjected to multiple fields from the transmitter elements of the module 12. Such multiple fields would result in a combined field which may be sub-optimal for the receiver, thereby reducing power transfer efficiency between the transmitter element and receiver.

In order to determine the optimal single transmitter element for operation (i.e., power transfer), communication between the various transmitter elements of the transmitter module 12, communication between the transmitter elements and the receiver 24, and between adjacent transmitter modules 12 is required as will be described.

Figure 5:
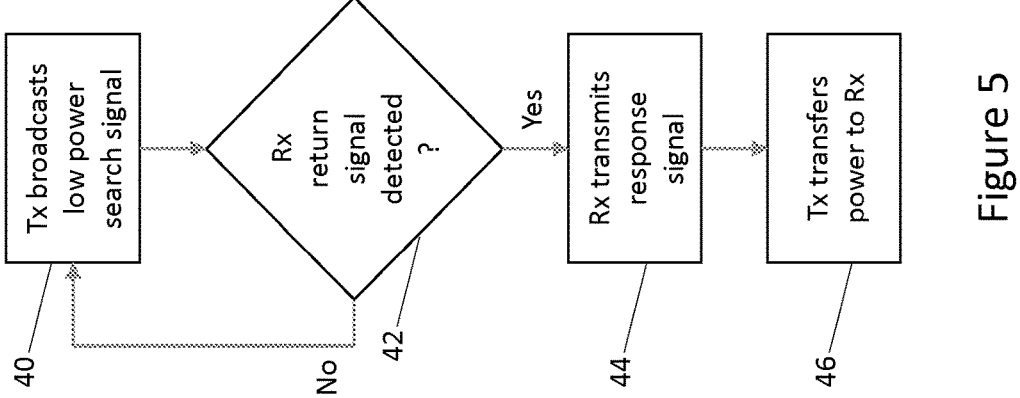
FIG. 5 is a flowchart of a method of operating a wireless power transfer system according to an aspect of the disclosure.

Turning now to FIG. 5, a method of operating the wireless power transfer system 10 is illustrated. The method may be performed at least partially by the transmitter controller 26. Additionally, a receiver controller (not shown) may perform one or more steps of the method.

Initially the transmitter module 12 transmits a low power pulse to detect if a receiver is proximate the module 12. In particular, each transmitter element in the module 12 transmits a pulse in an alternating manner. This alternation may operate in a variety of ways. For example, the first transmitter element 14*a* in the first transmitter module 12*a* may transmit the pulse while all other elements are inactive. Then the second element 16*a* in the first module 12*a* may transmit the pulse while all other elements are inactive. Then the first transmitter element 14*b* in the second transmitter module 12*b*, then the second element 16*b* in the second module 12*b*, and so on. As a further example, all transmitter elements in the same layer (same z plane) may transmit the pulse at the same time, while all other elements are inactive. For example, the first transmitter elements 14*a*, 14*b* in the first and second transmitter modules 12*a*, 12*b* may transmit the low power pulse simultaneously while the elements 16*a*, 16*b* are inactive. The low power pulse may not draw significant power from the power source 18 ensuring that the transmitter 20 does not use large amounts of power to detect a receiver. Additionally, the low power pulse ensures any exposed modules 12*a*, 12*b* do not generate power signals which exceed safe limits, e.g., Specific Absorption Rate (SAR) limits.

Transmitting continues until a receiver is detected 42. Once the receiver 22 is sufficiently close to one of the transmitter elements, the receiver 22 receives the low power pulse and transmits 44 a response signal. In this example, the response signal is the rectified voltage generated from the low power pulse. The receiver 22 may additionally send a signal to the transmitter element that the receiver is ready to receive power. The transmitter 20 then begins transferring 46 power to the receiver 22.

Figure 6:
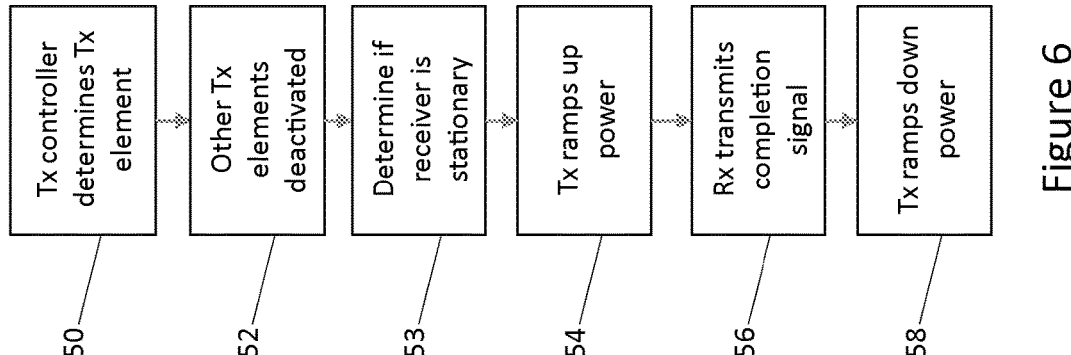
FIG. 6 is another flowchart of a method of operating a wireless power transfer system according to an aspect of the disclosure.

The process of transferring power to the receiver 22 is shown in more detail in FIG. 6. The transmitter element closest to the receiver 22 receives the response signal from the receiver. While other transmitter elements may also receive the response signal, the transmitter controller 26 determines 50 the transmitter element closest to the receiver 22 based on the received response signal. The response signal may be greater due to less attenuation during transmission to the closest transmitter element. The transmitter controller 26 may accordingly select a transmitter element, e.g., element 16*a*, for power transfer. The controller 26 then deactivates all other transmitter element. This controller 26 may only deactivate the other transmitter element in the same module 12, e.g., element 14*a*. In this way other transmitter modules may continue to operate and may be used to transfer power to other receivers. However, both transmitter elements of a single module, e.g., module 12*a*, do not transfer power at the same time. One element transfer power while the other is inactive. This may at least partially eliminate overlapping magnetic fields which may negatively power transfer or transfer efficiency.

The power being transferred by the transmitter element 16*a* is then ramped up 54 now that the other transmitter element 14*a* is inactive. Ramping up may comprise increasing the power being transferred from the transmitter element to the receiver element 24. Power is transferred from the transmitter element 16*a* to the receiver 22, i.e., the receiver element 24, at this increased power level, e.g., increased voltage or current.

Prior to ramping up 54 power, the method may determine 53 if the receiver 22 is stationary to ensure the power level is not increased while the receiver 22 is still moving. The receiver 22 may communicate, e.g., transmit, a rectified voltage to the transmitter modules 12*a*, 12*b*. At least one of the transmitter modules 12, 12*b*, e.g., transmitter module 12*a*, monitors the rectified voltage from the receiver 22 to determine a change in the voltage over time. A constant rectified voltage (i.e., no change in voltage for a threshold period of time) may indicate the receiver 22 is stationary. A non-constant voltage may indicate the receiver 22 is still moving. Ramping up 54 the power may be contingent on the receiver 22 being stationary. As such, the power being transferred may only be ramped up 54 once it has been determined 53 that the receiver 22 is stationary.

Once sufficient power has been transferred to the receiver 22, e.g., a battery at the receiver 22 is charged, the receiver 22 communicates 56 a completion signal to the transmitter module 12*a*. In response, the transmitter element 16*a* ramps down 58 power being transferred, i.e., decreases a power, voltage and/or current level. The power level may be reduced to a trickle charge, i.e., a charge equal to the self-discharge value of a load, e.g., battery, at the receiver 22.

While power transfer is described when the receiver element 24 is aligned with a transmitter element, e.g., element 16*a*, such alignment may not always be present. In order words, the receiver element 24 may be between to transmitter elements. While the receiver element 24 may be closer to one transmitter element than another, an impedance of the power transfer may be less than optimised if the impedance is based on perfect alignment between transmitter and receiver elements. As such, it may be beneficial to tune the transmitter module such that the transmitter elements transfer power at an operating impedance which optimised power transfer to a receiver at a variety of relative positions to the transmitter elements of the module. The receiver 22 may also be tuned to ensure optimised power transfer.

The transmitter module 12*a* may include an indicator, e.g., LED, which changes colour based on an operating condition of the module 12*a*. For example, the LED may flash green when the low power pulse is being transmitted, then solid green when a receiver is detected. The LED may then flash yellow when ramping up and transferred power to the receiver 22. The LED may then be solid yellow when charging is complete and only trickle charging is occurring. The LED may flash red if an error has occurred. Possible errors include no communication being possible between elements due to lack of connectivity, e.g., Wi-Fi being down.

Figures 7, 8:
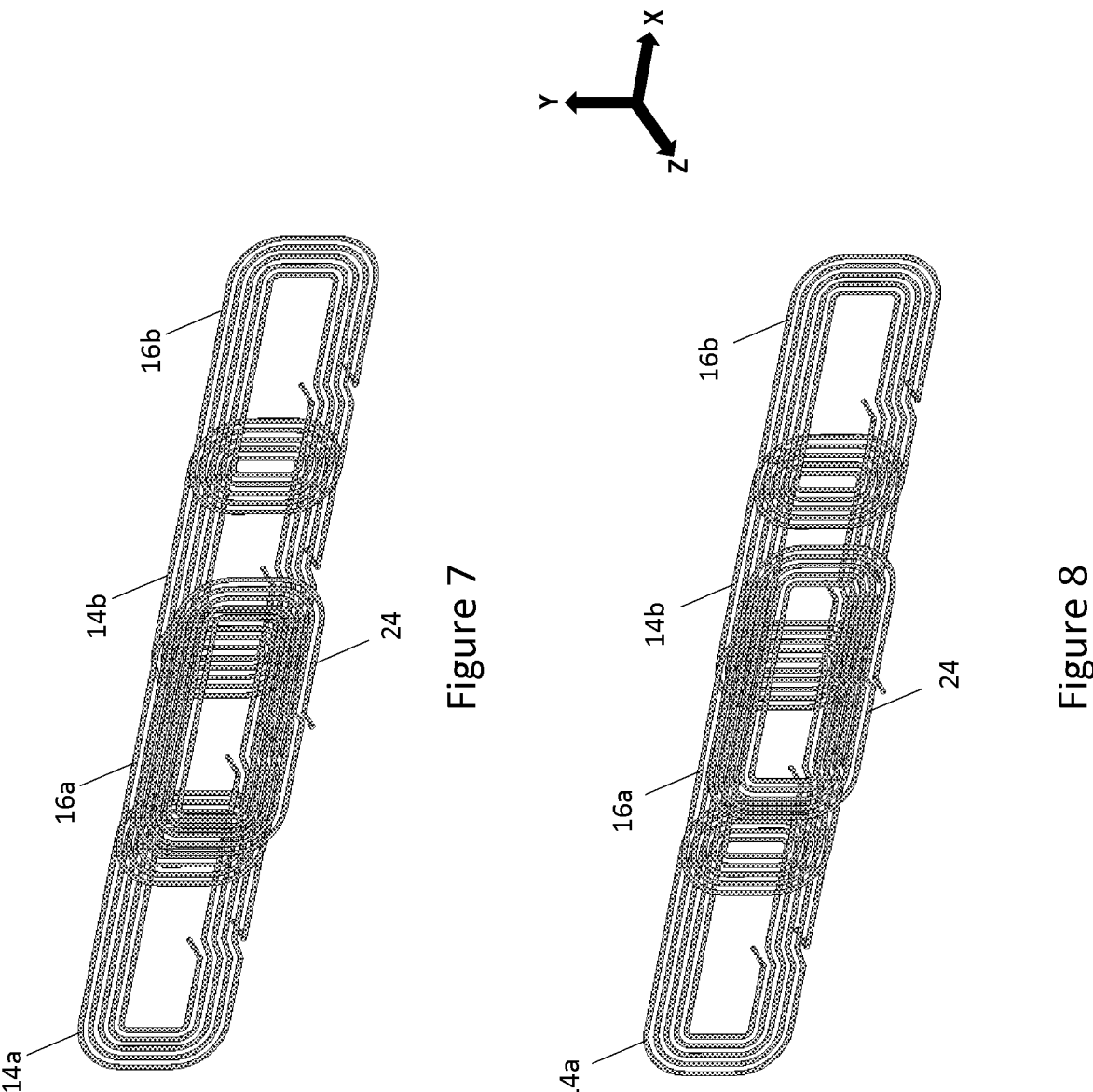
FIG. 7 is a perspective view of a portion of a wireless power transfer system according to an aspect of the disclosure in misalignment.
FIG. 8 is a perspective view of a portion of a wireless power transfer system according to an aspect of the disclosure in optimal alignment.

Turning now to FIG. 7, the receiver element 24 is shown in maximum misalignment with the transmitter element 16*a*. Any further movement of the receiver element 24 will move the receiver element 24 closer to the transmitter element 16*a* or to the transmitter element 14*b* of the other transmitter module, e.g., module 12*b*.

In FIG. 8, the receiver element 24 is shown in optimal alignment with the transmitter element 16a. While the receiver element 24 may be more closely aligned with the transmitter element 16a, the position of the receiver element 24 relative to the transmitter element 16a is half-way between the misaligned position of FIG. 7 and the aligned position of FIG. 4. Power transfer between the transmitter element 16a and the receiver element 24 is tuned on this basis. That is to say, an operating impedance of the transmitter element 16a is set a value based on this average position of the receiver element 24 between maximum alignment and maximum misalignment. Tuning the transmitter element 16a with this impedance value ensures that power transfer efficiency is on average maximised through the range of possible locations of the receiver element 24 at which the transmitter element 16a may transfer power to the receiver element 24.

Figure 9:
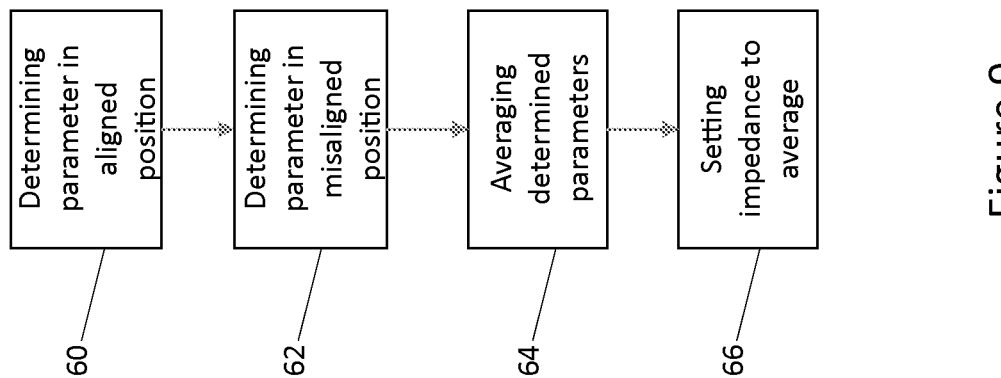
FIG. 9 is a flowchart of a method of tuning a transmitter module according to an aspect of the disclosure.

A method of tuning the transmitter module, e.g., element 16a, is illustrated in FIG. 9. The transmitter controller 26 determines 60 a parameter when the receiver element 24 is aligned with the transmitter element 16a. The transmitter controller 26 further determines 62 a parameter when the receiver element 24 is misaligned, i.e., maximum misalignment, with the transmitter element 16a. The parameter is the coupling impedance between the transmitter element 16a and the receiver element 24. The controller 26 then averages 64 the determined parameters and sets 66 the operating impedance of the transmitter element 16a to the average impedance. In this way, the transmitter element 16a may transfer power through a range of lateral positions of the receiver element 24 and optimized power transfer through this range. The tuning method may be repeated for the transmitter element 14a and for other transmitter elements of other transmitter modules.

A simulation of the wireless power transfer system 10 was tested and simulated results were obtained. The wireless power transfer system 10 was simulated with the following operating parameters: transmitter element length of 300 mm, transmitter element width of 150 mm (all transmitter elements have the same dimension), receiver element 24 length of 300 mm, and receiver element 24 width of 150 mm. The separation distance between adjacent (i.e., layers) transmitter elements in a single module is uniformly 5 mm. The separation distance between the shield and the adjacent transmitter element, e.g., transmitter element 14a, is 20 mm. The separation distance between the shield and the farther transmitter element in the module is therefore 25 mm.

The transmission or separation distance between the receiver element 24 and the transmitter element is 30 mm or 35 mm when in alignment with a transmitter element. The distance is 30 mm for a front transmitter element, e.g., element 16a or 16b, and 35 mm for a back transmitter element, e.g., element 14a or 14b. The gap, which may be an air gap, between transmitter elements in the same lateral plane (z axis plane) is 100 mm, i.e., distance between element 14a and 14b, or 16a and 16b.

Operation of the system 10 was simulated, the results of which are illustrated in FIGS. 10-12b. The front transmitter elements, i.e., elements in the same lateral plane, (element 16a and 16b) are energised or powered at the same time while elements in other lateral planes (elements 14a and 14b) are deactivated or not powering any receivers. The operating frequency of the system is 6.78 MHz.

Figure 10:
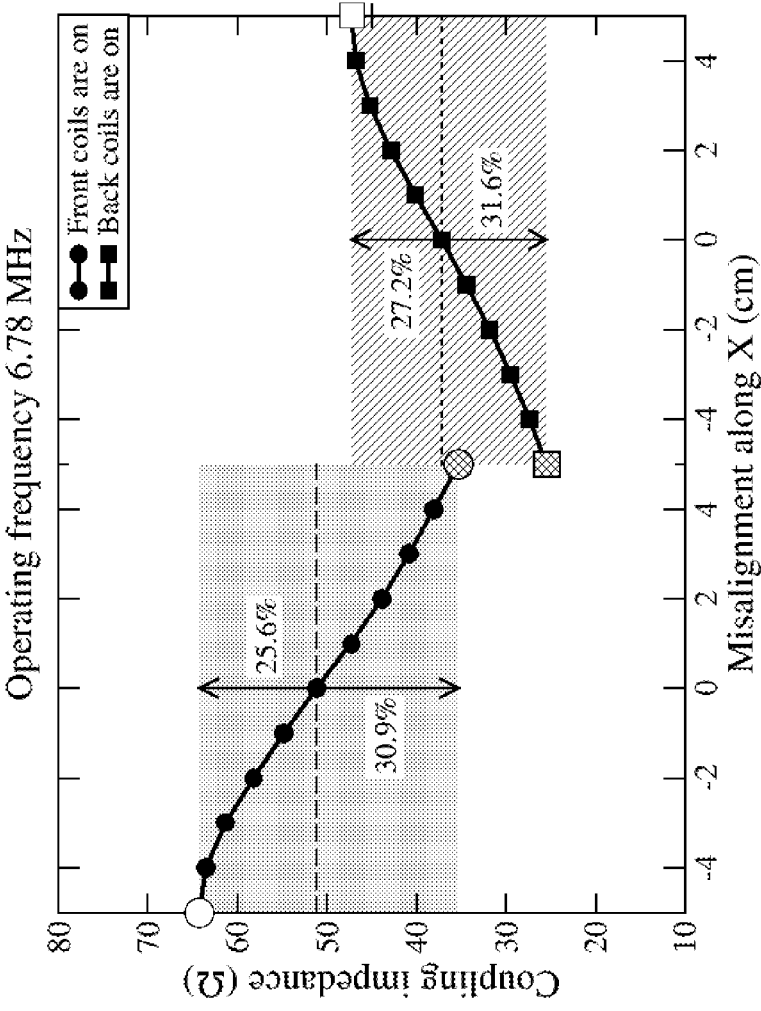
FIG. 10 is a graph of coupling impedance of transmitter elements of a wireless power transfer system according to an aspect of the disclosure.

FIG. 10 is a graph of the coupling impedance of the transmitter elements through a range of x axis positions of the receiver element 24. As shown on the left side of the graph with circular data points, the coupling impedance of the transmitter elements 16a, 16b ranges from approximately 65 to 37 ohms through −5 cm to +5 cm. Misalignment is measured relative to precise alignment between the receiver element 24 and the transmitter element 16a at 0 cm. The average impedance is approximately 51 ohms. This average impedance ranges from +25.6% to −30.9% depending on the misalignment along the x axis.

As shown on the right side of the graph with square data points, the coupling impedance of the transmitter elements 14a, 14b ranges from approximately 25 to 48 ohms through −5 cm to +5 cm. Misalignment is measured relative to precise alignment between the receiver element 24 and the transmitter element 14a at 0 cm. The average impedance is approximately 38 ohms. This average impedance ranges from +27.2% to −31.6% depending on the misalignment along the x axis.

Figure 11:
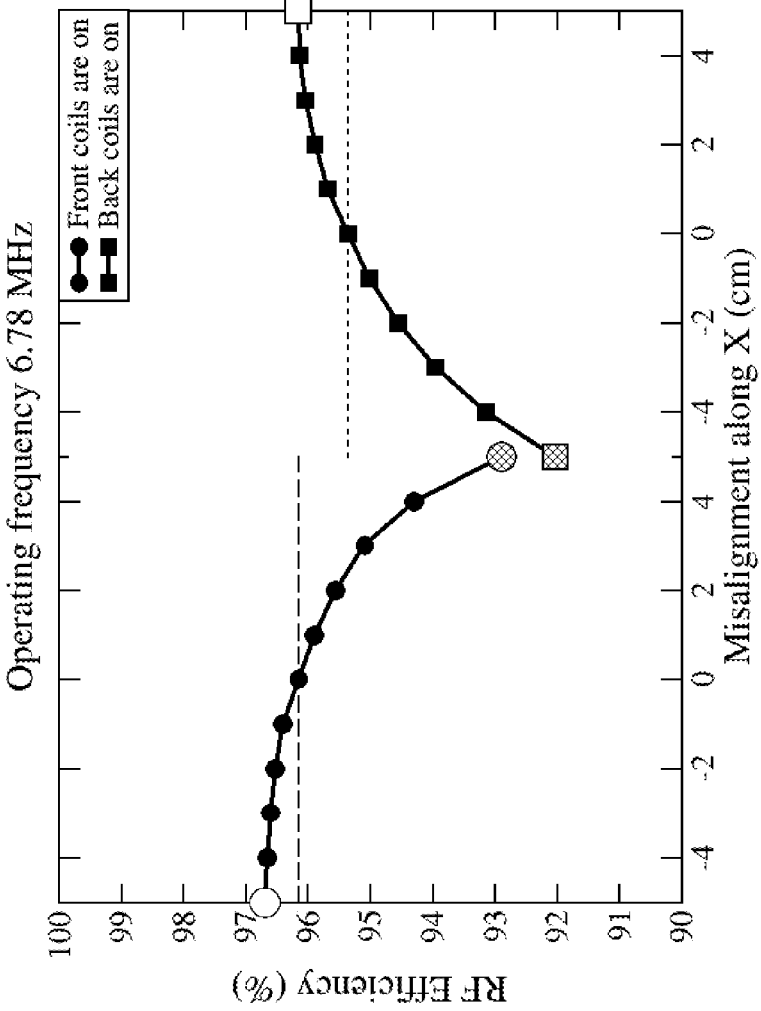
FIG. 11 is a graph of radio frequency (RF) efficiency of power transfer of a wireless power transfer system according to an aspect of the disclosure.

FIG. 11 is a graph of the radio frequency (RF) power transfer efficiency along the x axis when the receiver element 24 is coupled with the transmitter elements 16a, 16b (the front elements) on the left side of the graph, and with the transmitter elements 14a, 14b (the back elements) on the right side of the graph. The power transfer efficiency is the efficiency of power transfer between the respective transmitter elements and the receiver elements 24. When coupled to the front elements, the RF efficiency ranges from approximately 96.5% to approximately 93%. When coupled to the back elements, the RF efficiency ranges from approximately 92% to approximately 96.2%.

Figures 12A, 12B:
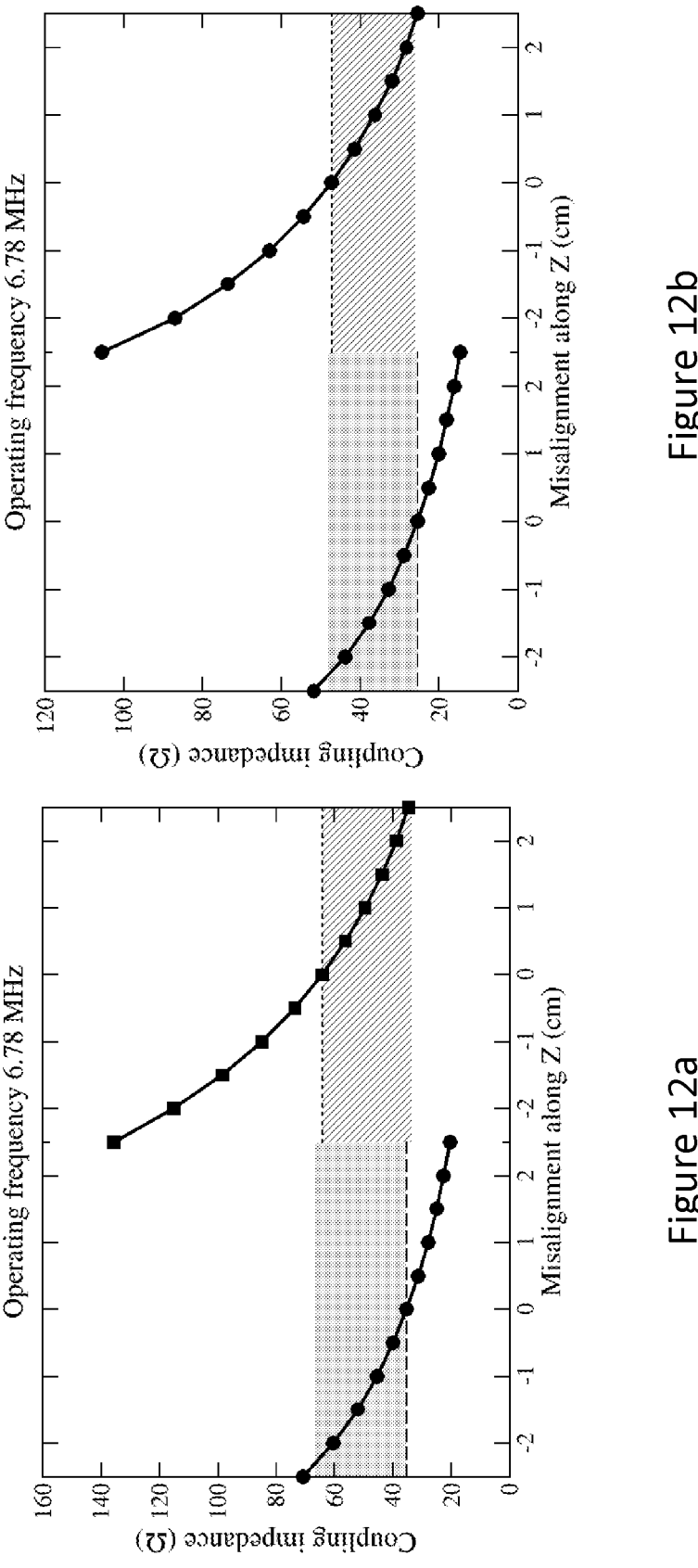
FIG. 12a is a graph of coupling impedance of front transmitter elements a wireless power transfer system according to an aspect of the disclosure.
FIG. 12b is a graph of coupling impedance of back transmitter elements a wireless power transfer system according to an aspect of the disclosure.

FIG. 12a illustrates the coupling impedance of the transmitter elements 16a, 16b (front elements) with the receiver element 24. The coupling impedance is presented during movement of the receiver element 24 along the z axis from −2.5 cm to +2.5 cm relative to the transmitter element 16a. The line on the left of the graph with circular data points illustrates the coupling impedance at a x axis misalignment of +5 cm as shown in FIG. 10. At this x axis misalignment, the coupling impedance varies from approximately 70 ohms to 20 ohms through the range of misalignment along the z axis. The line on the right of the graph with square data points illustrates the coupling impedance at a x axis misalignment of—5 cm as shown in FIG. 10. At this x axis misalignment, the coupling impedance varies from approximately 140 ohms to 35 ohms through the range of misalignment along the z axis.

FIG. 12b illustrates the coupling impedance of the transmitter elements 14a, 14b (back or rear elements) with the receive element 24. The coupling impedance is presented during movement of the receiver element 24 along the z axis from −2.5 cm to +2.5 cm relative to the transmitter element 14a. The line on the left of the graph with circular data points illustrates the coupling impedance at a x axis misalignment of +5 cm as shown in FIG. 10. At this x axis misalignment, the coupling impedance varies from approximately 50 ohms to 20 ohms through the range of misalignment along the z axis. The line on the right of the graph with circular data points illustrates the coupling impedance at a x axis misalignment of—5 cm as shown in FIG. 10. At this x axis misalignment, the coupling impedance varies from approximately 105 ohms to 25 ohms through the range of misalignment along the z axis.

Figure 13:
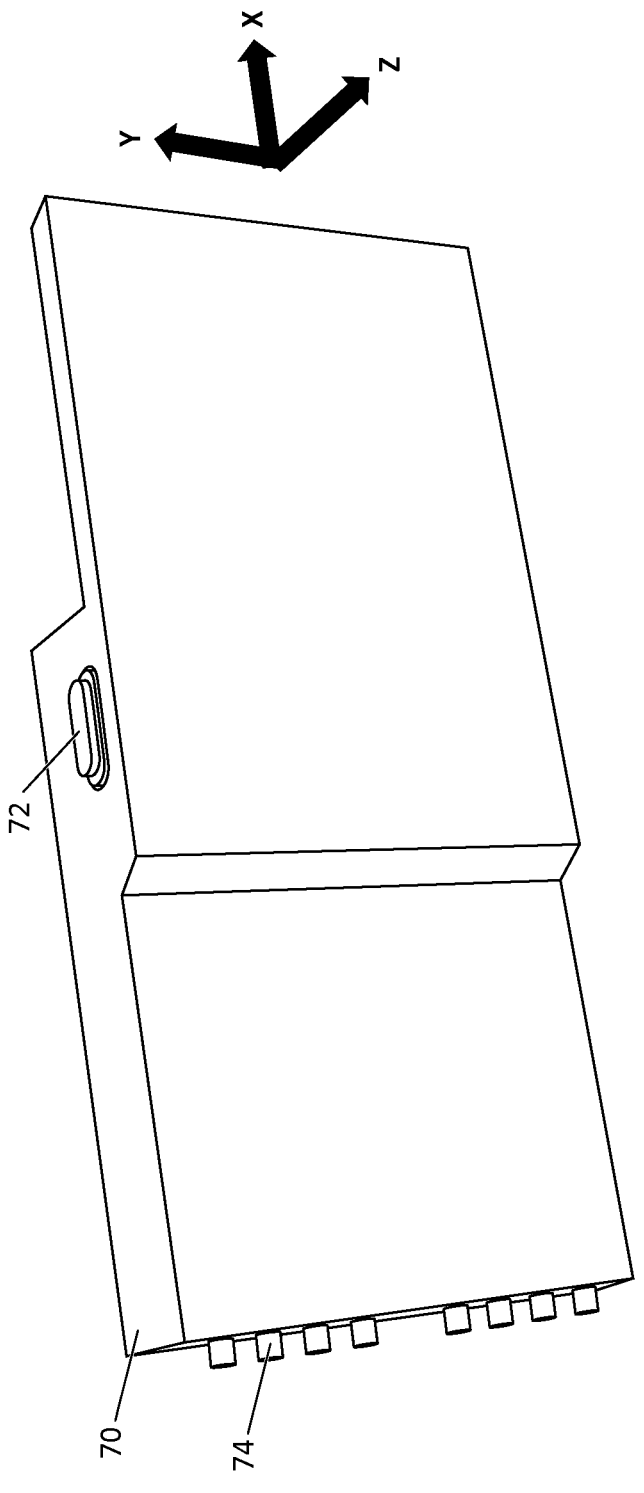
FIG. 13 is a perspective view of a housing containing a transmitter module according to an aspect of the disclosure.

While simulation of the system 10 in operation has been described, an exemplary transmitter module 12 is illustrated in FIG. 13. In this example embodiment, the transmitter elements 14, 16 are contained within a housing 70. An indicator 72, e.g., an LED, is visible on a side of the housing 70 to indicate a state of the transmitter module 12. The housing 70 contains the transmitter elements 14, 16 and any other components of the module, e.g., the transmitter controller 26. The housing 70 is an N shaped pentomino. The first transmitter element 14 occupies one lateral plane in the housing 70 in a first layer. The second transmitter element 16 partially overlays the first transmitter element 14 occupies a second lateral plane in the housing 70 in a second layer. Plugs 74 extend from a lateral face of the housing 70 for connection with other housings containing other transmitter modules 12. Corresponding plug sockets are present on the opposite lateral face of the housing 70 (not visible).

The shape of each housing 70 allows for the overlap of front and back transmitter elements as described.

As illustrated in FIG. 13, the shape of the housing 70, and the plugs 74 and sockets allow for adjacent housings 70 to be connected to each other. Thus, the number of modules may be increased or decreased easily without any modification to the operational method or modifying the design of individual transmitter modules. Further, connected housings 70 form a continuous homogeneous transmitter element layout when the housings 70 are connected together.

While not illustrated in FIG. 13, a shield (passive electrode) may be present within the housing 70. The shield may limit signals, such as a field generated by one or more transmitter elements of a transmitter module, to one z direction. This may ensure SAR limits are met. Connecting adjacent housings 70 forms one continuous shield along connected housings 70.

Figure 14:
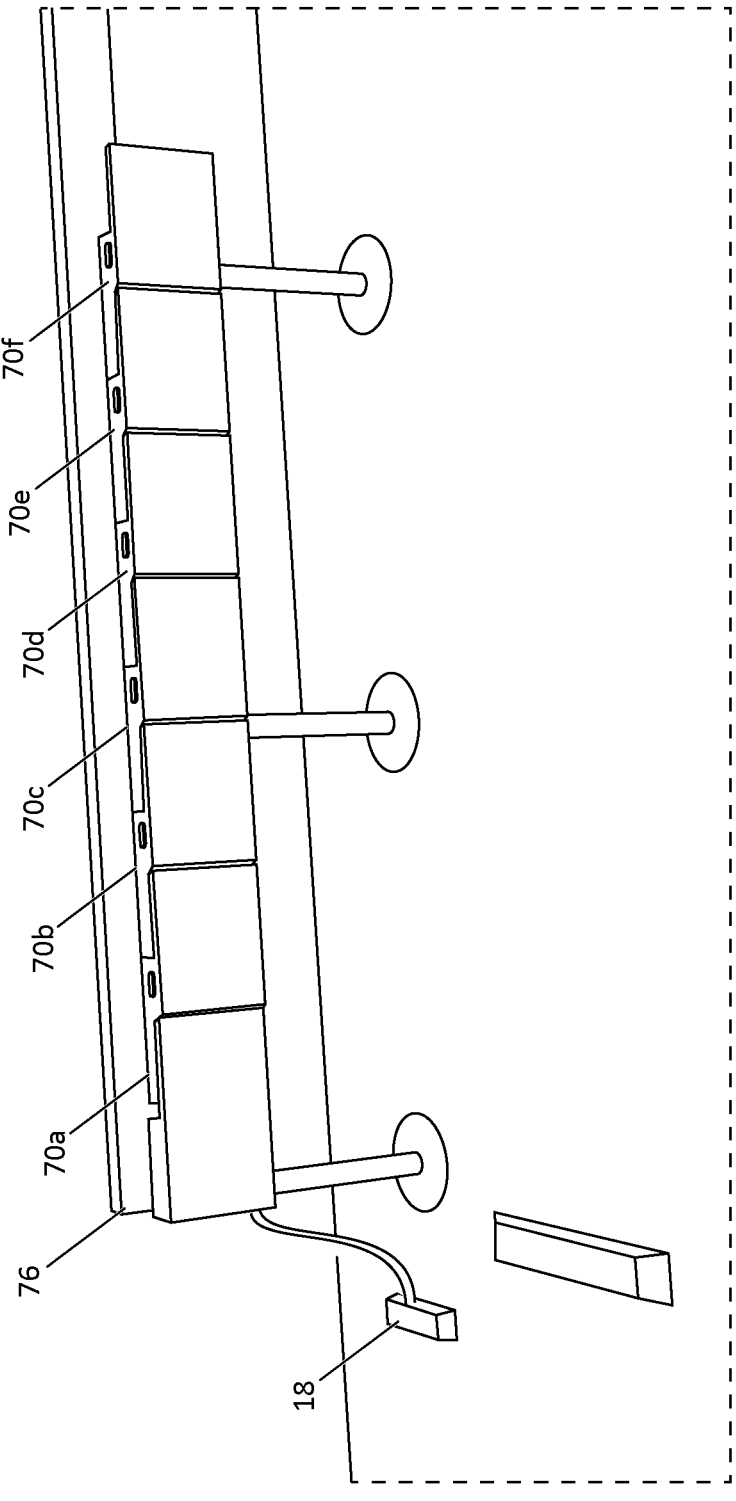
FIG. 14 is a perspective view of multiple housings according to an aspect of the disclosure.

FIG. 14 illustrates a number of transmitter modules connected to each other and mounted on a rail 76. In particular, housings 70a, 70b, 70c, 70d, 70e, and 70f are connected to each other and mounted on the rail 76. A single power source 18 provides power to the transmitter elements of the transmitter module within all the housings 70a, 70b, 70c, 70d, 70e, 70f. Each housing contains one transmitter module having two transmitter elements, e.g., 14, 16. One of the two transmitter elements in each of the housings are aligned in a first lateral plane (z axis plane), i.e., the front transmitter elements. The other of the two transmitter elements in each of the housings are aligned in a second lateral plane (z axis plane), i.e., the back or rear transmitter elements.

A single receiver may move along the x axis parallel to the housings until it stops. Upon stopping for a sufficient period of time, power may be transmitted from one of the transmitter elements of one module within one housing, e.g., housing 70d, to a receiver element of the receiver.

Figure 15:
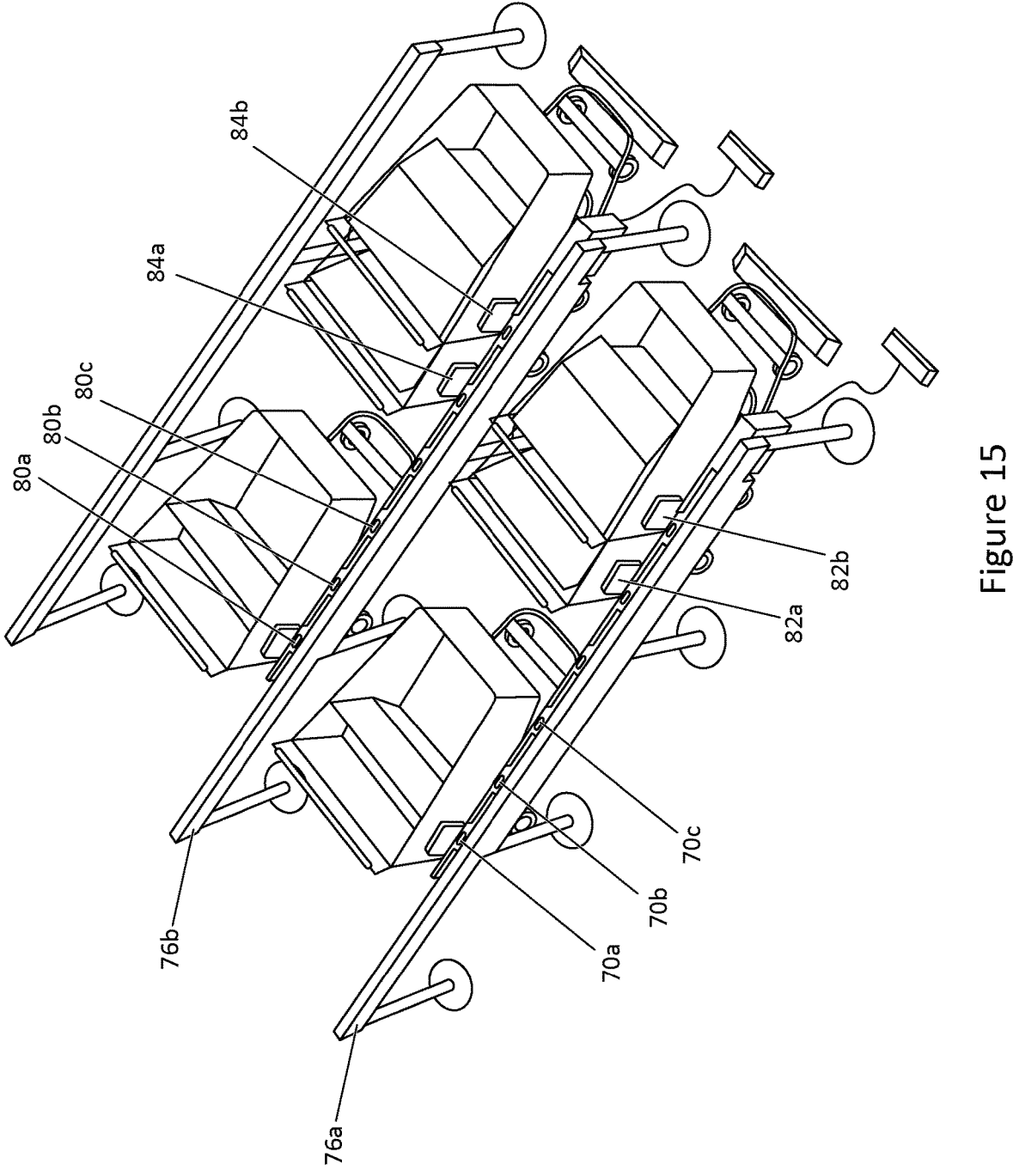
FIG. 15 is a perspective view of multiple housings and receivers according to an aspect of the disclosure.

Turing now to FIG. 15, a number of housings 70a, 70b, 70c along a first rail 76a and a number of housings 80a, 80b, 80c along a second rail 76b. Multiple receivers, e.g., receivers 82a, 82b, which in the illustrated embodiment are mounted on shopping carts, may be aligned within transmitter elements of housings on the first rail 76a. Other receives, e.g., receivers 84a, 84b, may be aligned with transmitter elements of housings on the second rail 76b. In this way, receivers may receive power from transmitter elements on two different rails with elements on the same rail not interfering with each other, and elements on different rails not interring with each other. In this way, maximum power may be transferred to the maximum number of receivers while having a high degree of tolerance for misalignment between receiver and transmitter elements.

The size of the transmitter modules within the housings 80a, 80b, 80c (and therefore the size of the housings) could be optimized for a particular receiver size. For example, when the receivers 82a, 82b are stacked together, there is a limit to the stacking spacing which will determine how close together the receivers can be stacked. The transmitter modules lengths may be sized (and therefore the length of the transmitter elements within the modules) so that the distance between adjacent transmitter modules is equal to the minimum stacking distance between receivers.

If the transmitter distance is greater, then not all receivers may be powered at the same time when stacked together in their tightest configuration. If the transmitter distance is smaller, then there will be more transmitter modules than needed resulting in unnecessary excess.

While this optimization has been described in respect of shopping carts, a similar optimization method could apply to other receiver configuration which may be stacked to some minimum distance such as: trolleys at airports or train stations, shopping baskets, folding chairs or tables, electric scooters or bicycles, or other powered devices.

One of skill in the art will appreciate that while the transmitter modules are shown in a specific orientation, other configurations are also possible. For example, the transmitter module may be attached to the floor, and receivers to the bottom or underside of a vehicle/receiving unit. Conversely, the transmitter modules may also be attached to an overhead or ceiling mounted structure, and receivers mounted to the top of a vehicle/receiving unit.

Figure 16:
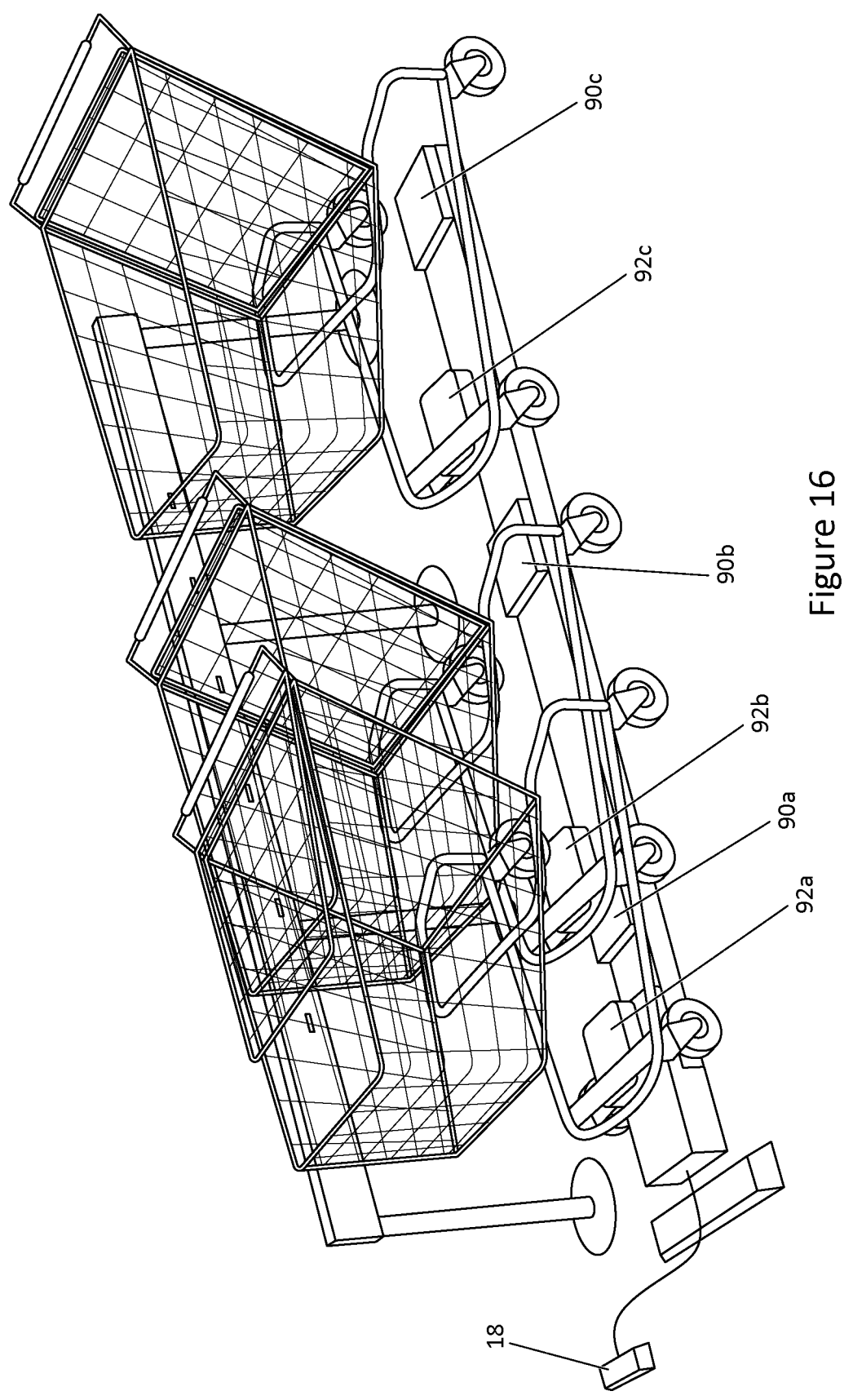
FIG. 16 is a perspective view of another embodiment of multiple housings and receivers according to an aspect of the disclosure.

Turning now to FIG. 16, another arrangement of the transmitter modules is illustrated. In this arrangement, housing 90a-90c are floor mounted. A single power source 18 provides power to the transmitter elements of the transmitter module within all the housings 90a-90c. Each housing contains one transmitter module having two transmitter elements, e.g., 14, 16. One of the two transmitter elements in each of the housings are aligned in a first plane (y axis plane), i.e., the front transmitter elements. The other of the two transmitter elements in each of the housings are aligned in a second plane (y axis plane), i.e., the back or rear transmitter elements.

Multiple receivers 92a-92c are mounted on the bottom of shopping carts, may be aligned within transmitter elements of the housings 90a-90c. Power may be transferred from the housings 90a-90c to the receivers 92a-90c.

Additionally, while shopping carts have been described, one of skill in the art will appreciate that other receiver vehicles or receiver units are possible. For example, receivers may be attached to beds (such as stretchers, gurneys, or mobile beds), equipment carts (such as medical equipment carts, crash carts, mobile tool carts).

Although embodiments have been described above with reference to the figures, those of skill in the art will appreciate that variations and modifications may be made without departing from the scope thereof as defined by the appended claims.

The invention claimed is:

1. A method of operating at least one transmitter module of a wireless power transfer system, each transmitter module comprising a plurality of transmitter elements arranged in a plurality of offset layers with one transmitter element per layer, the method comprising:

detecting a receiver at at least one transmitter element of the transmitter module, wherein the detecting comprises detecting the receiver based on a response signal from the receiver;

in response to the detecting, generating a power signal to transfer power from a first transmitter element of the transmitter module to the detected receiver;

causing a second transmitter element of the transmitter module to remain inactive during the transferring;

detecting a response signal at each transmitter element of the transmitter module;

comparing the detected response signals; and selecting the first transmitter element based on the comparing.

2. The method of claim 1, wherein the response signal comprises a parameter of the receiver.

3. The method of claim 1, further comprising:

communicating the response signal to a second transmitter module.

4. The method of claim 1, further comprising:

tuning the first transmitter element, wherein tuning comprises setting an impedance of the first transmitter element.

5. The method of claim 4, wherein a value of the impedance comprises an average of a value of the impedance when the receiver is aligned with the first transmitter element and a value of the impedance when the receiver is misaligned with the first transmitter element.

6. The method of claim 1, further comprising:

transmitting a search signal from at least one transmitter element of the transmitter module; and alternatingly transmitting the search signal from the plurality of transmitter elements of the transmitter module.

7. The method of claim 6, further comprising:

detecting the receiver based on the transmitted search signal.

8. The method of claim 1, further comprising:

receiving a completion signal from a receiver; and modifying the power signal based on the completion signal.

9. A transmitter module of a wireless power transfer system, the transmitter module comprising a plurality of transmitter elements arranged in a plurality of offset layers with one transmitter element per layer, each transmitter element adapted to generate a field for transferring power to a receiver, the transmitter module further comprising a controller adapted to perform the method of claim 1.

10. A wireless power transfer system comprising:

a transmitter module comprising a plurality of transmitter elements arranged in a plurality of offset layers with one transmitter element per layer, each transmitter element adapted to generate a field for transferring power to a receiver, the transmitter module further comprising a transmitter controller; and a receiver configured to receive power from a transmitter element of the transmitter module, the receiver comprising a receiver element for extracting power from a field generated by a transmitter element and a transmitter controller, the transmitter controller adapted to perform the method of claim 1.

11. The system of claim 10, wherein the receiver comprises a receiver controller, and wherein the receiver controller is adapted to:

send a signal to at least one transmitter element of the plurality of transmitter elements of the transmitter module; and control the receiver element to extract power from a field generated by a transmitter element of the plurality of transmitter elements, the transmitter element selected based on the signal.

12. A non-transitory computer-readable medium having computer program code stored thereon, the computer program code, when executed by a processor, configured to perform the method of claim 1.

* * * * *